United States Patent
Tsubosaka et al.

(10) Patent No.: US 9,761,898 B2
(45) Date of Patent: Sep. 12, 2017

(54) MEMBRANE ELECTRODE ASSEMBLY, FUEL CELL USING THE SAME AND MANUFACTURING METHOD OF MEMBRANE ELECTRODE ASSEMBLY

(75) Inventors: Kenji Tsubosaka, Susono (JP); Hiroo Yoshikawa, Toyota (JP); Junji Nakanishi, Kasugai (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 359 days.

(21) Appl. No.: 13/823,513

(22) PCT Filed: Nov. 4, 2010

(86) PCT No.: PCT/JP2010/006503
§ 371 (c)(1),
(2), (4) Date: Mar. 14, 2013

(87) PCT Pub. No.: WO2012/035591
PCT Pub. Date: Mar. 22, 2012

(65) Prior Publication Data
US 2013/0177832 A1     Jul. 11, 2013

(30) Foreign Application Priority Data
Sep. 16, 2010   (JP) ................................ 2010-207685

(51) Int. Cl.
*H01M 8/00* (2016.01)
*H01M 8/02* (2016.01)
(Continued)

(52) U.S. Cl.
CPC ....... *H01M 8/1004* (2013.01); *H01M 8/0271* (2013.01); *H01M 8/0276* (2013.01);
(Continued)

(58) Field of Classification Search
CPC ............. H01M 8/0271; H01M 8/0276; H01M 8/1004; H01M 8/0297
(Continued)

(56) References Cited

U.S. PATENT DOCUMENTS 6,667,125 B2 * 12/2003 Resto ........................... 429/480
2003/0049518 A1    3/2003 Nanaumi et al.
(Continued)

FOREIGN PATENT DOCUMENTS

JP          01-059704 B2    12/1989
JP          11-204122 A      7/1999
(Continued)

*Primary Examiner* — Sean P Cullen
(74) *Attorney, Agent, or Firm* — Andrews Kurth Kenyon LLP

(57) ABSTRACT

There is provided a technique of preventing degradation of an electrolyte membrane included in a fuel cell. A fuel cell includes a membrane electrode assembly. The membrane electrode assembly is provided as a power generation device where electrodes are arranged on both sides of an electrolyte membrane having proton conductivity. Each of the electrodes has a layered structure of stacking a catalyst layer arranged to support a catalyst and a gas diffusion layer arranged to spread a reactive gas over the entire electrode plane. The outer peripheral edge of the gas diffusion layer is located inward of the outer peripheral edge of the catalyst layer.

8 Claims, 26 Drawing Sheets

(51) Int. Cl.
*H01M 8/10* (2016.01)
*H01M 8/1004* (2016.01)
*H01M 8/0271* (2016.01)
*H01M 8/0276* (2016.01)
*H01M 8/0297* (2016.01)
*H01M 8/1018* (2016.01)

(52) U.S. Cl.
CPC .. *H01M 8/0297* (2013.01); *H01M 2008/1095* (2013.01); *Y02P 70/56* (2015.11)

(58) Field of Classification Search
USPC ................ 429/480, 535, 482, 483, 507–510
See application file for complete search history.

(56) References Cited

U.S. PATENT DOCUMENTS

| | | | |
|---|---|---|---|
| 2005/0142397 A1 | 6/2005 | Wakahoi et al. | |
| 2006/0269828 A1 | 11/2006 | Tanaka et al. | |
| 2008/0199761 A1* | 8/2008 | Heystek et al. | 429/40 |
| 2009/0169946 A1* | 7/2009 | Skiba et al. | 429/30 |
| 2009/0253014 A1* | 10/2009 | Tanahashi | H01M 8/0284 429/434 |
| 2010/0190089 A1* | 7/2010 | Akiyama | 429/492 |

FOREIGN PATENT DOCUMENTS

| | | |
|---|---|---|
| JP | 2003-068323 A | 3/2003 |
| JP | 2004-146250 A | 5/2004 |
| JP | 2005-149803 A | 6/2005 |
| JP | 2005-209605 A | 8/2005 |
| JP | 2006-331718 A | 12/2006 |
| JP | 2007-213830 A | 8/2007 |
| JP | 2010-040278 A | 2/2010 |
| JP | 2012-226847 A | 11/2012 |
| JP | 2013-033650 A | 2/2013 |

* cited by examiner

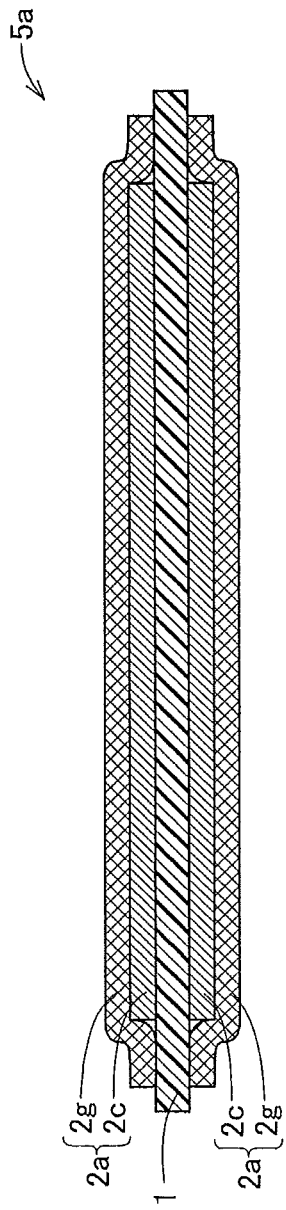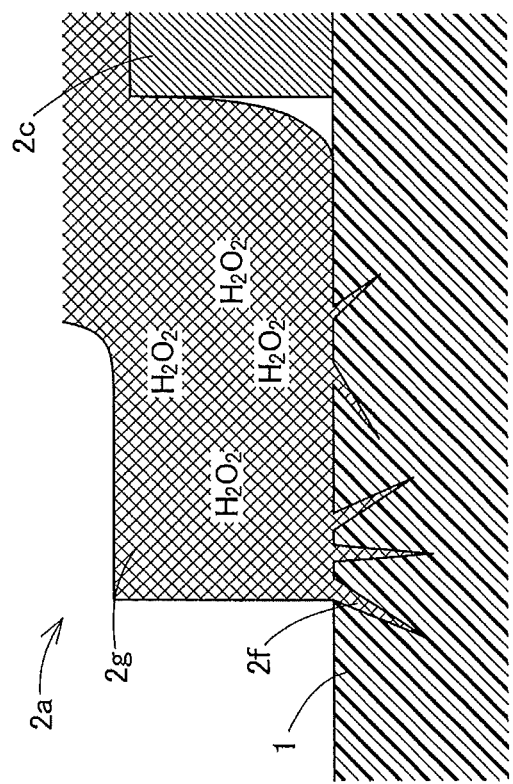
Fig.2A
Fig.2B

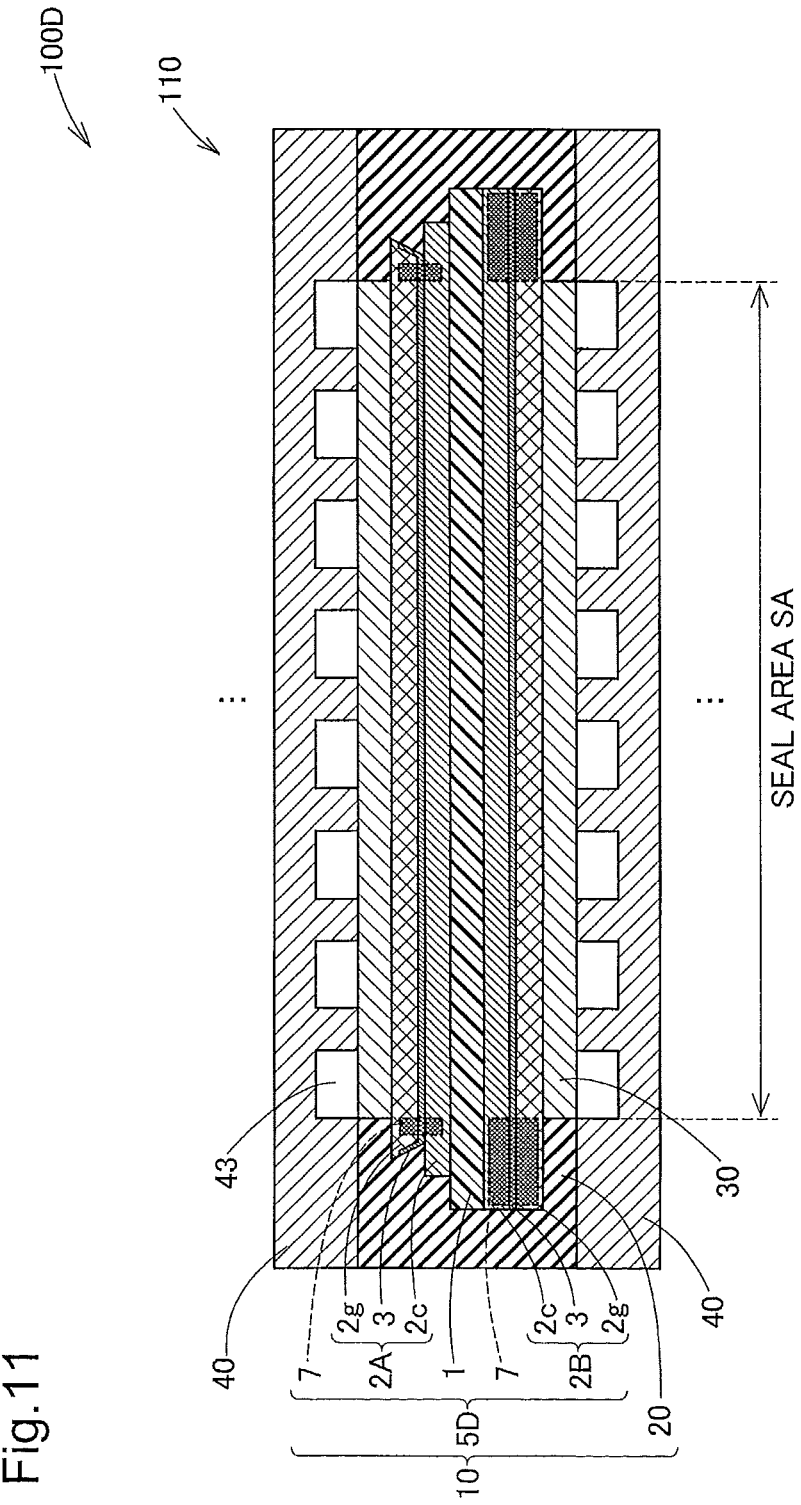

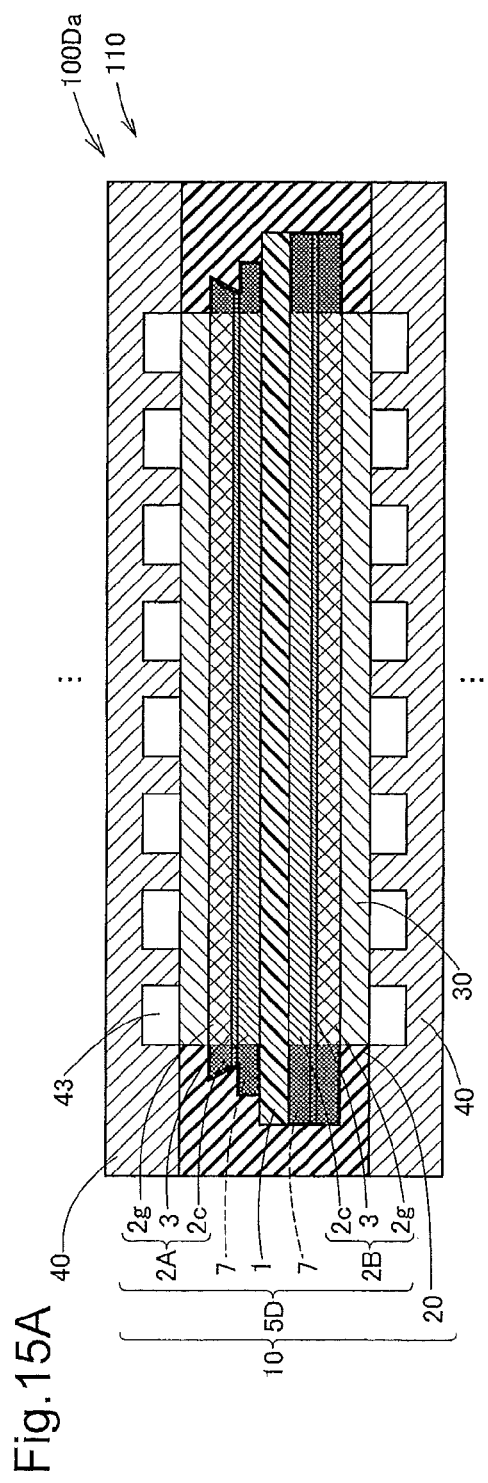
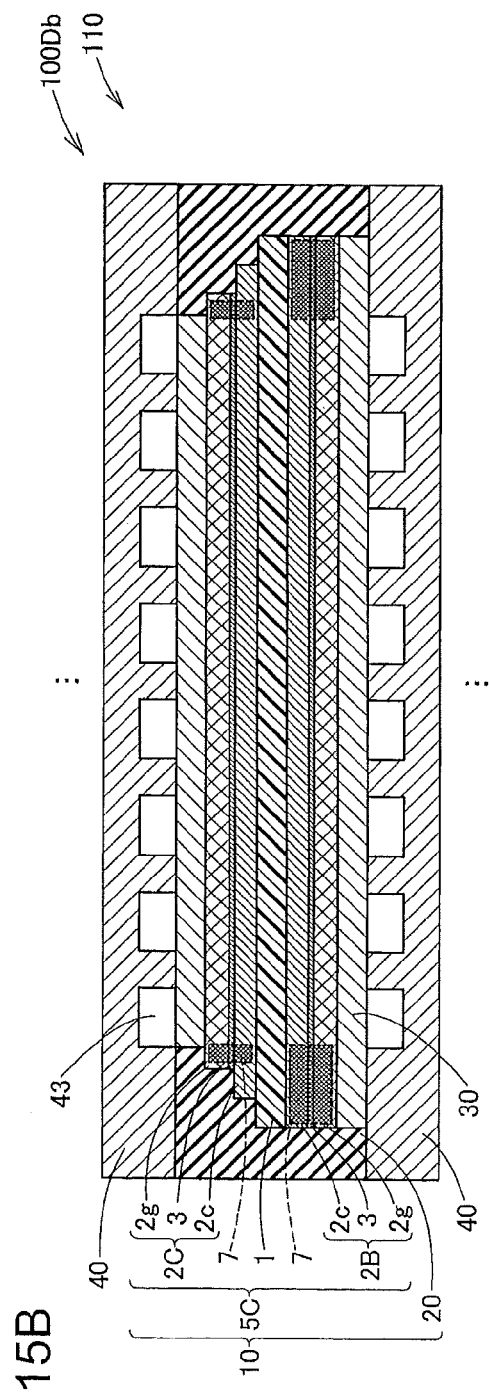
Fig. 15A
Fig. 15B

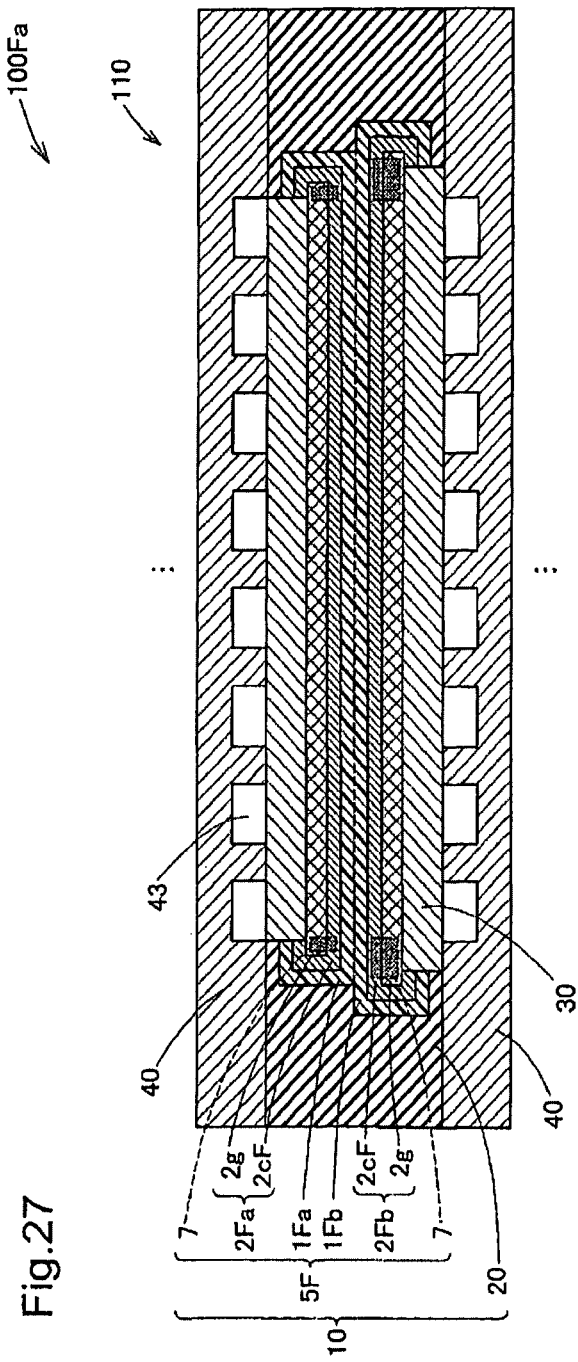

MEMBRANE ELECTRODE ASSEMBLY, FUEL CELL USING THE SAME AND MANUFACTURING METHOD OF MEMBRANE ELECTRODE ASSEMBLY

This is a 371, national phase application of PCT/JP2010/006503, filed 04 Nov. 2010, which claims priority to Japanese Patent Application No. 2010-207685, filed 16 Sep. 2010, the contents of which are incorporated herein by reference.

TECHNICAL FIELD

The present invention relates to a fuel cell.

BACKGROUND ART

The known structure of a fuel cell includes a membrane electrode assembly where electrodes are arranged on both sides of an electrolyte membrane having proton conductivity. The electrode includes a gas diffusion layer arranged to spread a reactive gas over the entire electrode plane and a catalyst layer arranged to support a catalyst for accelerating the fuel cell reaction (PTL1).

During power generation of the fuel cell, hydrogen and oxygen as the reactive gases may respectively pass through the electrolyte membrane and migrate to the opposite electrodes to the electrodes that originally receive the respective supplies of the reactive gases. In such cases, hydrogen and oxygen may be present simultaneously on the same electrode side of the membrane electrode assembly and may react with each other to produce hydrogen peroxide. The produced hydrogen peroxide may be radicalized to hydrogen peroxide radical, which is known as a cause of degrading the electrolyte membrane.

The gas diffusion layer is often made of a fiber base material having electrical conductivity. Fluffs as small projections are present on the outer surface of the fiber base material or more specifically at the edge of the fiber base material. In the membrane electrode assembly, the fluffs may be stuck into the electrolyte membrane and damage the electrolyte membrane. There has been no sufficient measure proposed to prevent such degradation of the electrolyte membrane.

CITATION LIST

Patent Literature

PTL1:, JP 2007-213830A

SUMMARY OF INVENTION

Technical Problem

The object of the invention is thus to provide a technique of preventing degradation of an electrolyte membrane in a fuel cell.

Solution to Problem

In order to solve at least part of the above problems, the invention provides various aspects and embodiments described below.

A First Aspect:

According to a first aspect, there is provided a membrane electrode assembly used for a fuel cell, which comprises: an electrolyte membrane; and first and second electrode layers arranged on respective sides of the electrolyte membrane. Each of the first and the second electrode layers includes a catalyst layer and a gas diffusion layer, wherein the catalyst layer is arranged to be in contact with the electrolyte membrane, and the gas diffusion layers is placed on the catalyst layer. In at least the first electrode layer out of the first and the second electrode layers, a catalyst layer-side face of the gas diffusion layer is made smaller in size than a gas diffusion layer-side face of the catalyst layer, so that an outer peripheral edge of the gas diffusion layer is located inward of an outer peripheral edge of the catalyst layer.

In the membrane electrode assembly of this aspect, the outer peripheral edge of the gas diffusion layer is located inward of the outer peripheral edge of the catalyst layer. This prevents the gas diffusion layer from being in direct contact with the electrolyte membrane. The hydrogen peroxide radical produced in the gas diffusion layer passes through the catalyst layer before arriving at the electrolyte membrane and accordingly disappears in the catalyst layer. This effectively prevents degradation of the electrolyte membrane by the hydrogen peroxide radical. Additionally the catalyst layer also serves as the protective layer for protecting the electrolyte membrane from the edge of the gas diffusion layer.

A Second Aspect:

According to a second aspect, there is provided the membrane electrode assembly of the first aspect, wherein at least the first electrode layer out of the first and the second electrode layers may include a water-repellent layer between the catalyst layer and the gas diffusion layer. The water-repellent layer may be arranged to cover at least part of an outer peripheral end face of the gas diffusion layer. The gas diffusion layer may be made of a fiber base material.

In the membrane electrode assembly of this aspect, fluffs present on the catalyst layer-side face and the outer peripheral end face of the gas diffusion layer are covered with the water-repellent layer. Such coverage protects the electrolyte membrane from the fluffs that are present on the outer surface of the base material for the gas diffusion layer. Especially a large number of fluffs are present on the outer peripheral edge of the gas diffusion layer. Covering the outer peripheral edge of the gas diffusion layer by the water-repellent layer improves the effect of protecting the electrolyte membrane.

A Third Aspect:

According to a third aspect, there is provided the membrane electrode assembly of the second aspect, wherein the water-repellent layer may be made of a water-repellent thin film that contains a water-repellent resin as a main component.

In the membrane electrode assembly of this aspect, the water-repellent thin film provided as the water-repellent layer covers the fluffs that are present on the outer surface of the gas diffusion layer, so as to more effectively protect the electrolyte membrane.

A Fourth Aspect:

According to a fourth aspect, there is provided the membrane electrode assembly of any one of the first to the third aspects, wherein at least one of the first and the second electrode layers may include an adhesive material, which is provided along a circumferential area surrounding a power generation area, and serves to prevent separation of the gas diffusion layer from the catalyst layer.

The membrane electrode assembly of this aspect prevents the gas diffusion layer from being separated from the catalyst layer. This advantageously prevents leakage of the reactive gases and thereby prevents degradation of the electrolyte membrane and the electrodes.

A Fifth Aspect:

According to a fifth aspect, there is provided the membrane electrode assembly of the fourth aspect, wherein in at least the first electrode layer, the adhesive material may be impregnated in the catalyst layer and the gas diffusion layer in a circumferential area along the outer peripheral edge of the gas diffusion layer located inward of the outer peripheral edge of the catalyst layer, in order to prevent a reactive gas from being diffused to the outer peripheral edge of the catalyst layer that is protruded outward from the outer peripheral edge of the gas diffusion layer.

In the membrane electrode assembly of this aspect, the presence of the adhesive material prevents the reactive gas from being diffused to the outer peripheral edge of the catalyst layer that is protruded from the outer peripheral edge of the gas diffusion layer and thereby prevents the heat of reaction from being generated at the outer peripheral edge of the catalyst layer. This advantageously prevents the heat of reaction from being transferred from the area at the outer peripheral edge of the catalyst layer to the electrolyte membrane and prevents degradation of the electrolyte membrane caused by the heat of reaction.

A Sixth Aspect:

According to a sixth aspect, there is provided the membrane electrode assembly of any one of the first to the fifth aspects, wherein at least the second electrode layer out of the first and the second electrode layer may be provided with a locking element that is formed by folding a protruded area of a gas diffusion layer-side face of the catalyst layer, which is protruded from the outer peripheral edge of the gas diffusion layer, toward a gas diffusion layer-side and that serves to prevent the catalyst layer from being separated from the gas diffusion layer.

In the membrane electrode assembly of this aspect, the locking element for preventing separation of the gas diffusion layer from the catalyst layer is provided by using the protruded area of the catalyst layer protruded from the outer peripheral edge of the gas diffusion layer. This efficiently prevents the gas diffusion layer from being separated from the catalyst layer.

A Seventh Aspect:

According to a seventh aspect, there is provided the membrane electrode assembly of any one of the first to the sixth aspects, wherein the second electrode layer may be provided with a locking element that is formed at the outer peripheral edge of the gas diffusion layer by folding a protruded area of the gas diffusion layer, which is protruded from the outer peripheral edge of the catalyst layer, and that serves to prevent the catalyst layer from being separated from the gas diffusion layer.

In the membrane electrode assembly of this aspect, the locking element for preventing separation of the gas diffusion layer from the catalyst layer is provided by using the protruded area of the gas diffusion layer protruded from the catalyst layer. This efficiently prevents the gas diffusion layer from being separated from the catalyst layer.

An Eighth Aspect:

According to an eighth aspect, there is provided the membrane electrode assembly of the sixth aspect, wherein an outer peripheral edge of the electrolyte membrane may be protruded outward of the gas diffusion layer and may have a first electrode layer-side face and a second electrode layer-side face that are parted in two directions along a thickness direction of the electrolyte membrane and that are separately folded down toward a first electrode layer-side and a second electrode layer-side. The outer peripheral edge of the catalyst layer in each of the first and the second electrode layers may be provided with a locking element, wherein the locking element is formed by folding down an outside area of the gas diffusion layer side-face of the catalyst layer outward of the gas diffusion layer together with the outer peripheral edge of the electrolyte membrane toward the gas diffusion layer-side and serves to prevent the catalyst layer from being separated from the gas diffusion layer.

In the membrane electrode assembly of this aspect, the locking elements are provided at the outer peripheral edges of the two electrode layers by using the electrolyte membrane and the catalyst layers. This efficiently and securely prevents the gas diffusion layer from being separated from the catalyst layer. The presence of the locking element also enhances the integrity of the membrane electrode assembly.

A Ninth Aspect:

According to a ninth aspect, there is provided a fuel cell that comprises the membrane electrode assembly of any one of the first to the eighth aspects.

The fuel cell of this aspect prevents degradation of the electrolyte membrane in the membrane electrode assembly. This enhances the durability of the fuel cell.

A Tenth Aspect:

According to a tenth aspect, there is provided a manufacturing method of a membrane electrode assembly for a fuel cell, wherein the membrane electrode assembly has an electrode layer that includes a catalyst layer arranged to be in contact with an electrolyte membrane and a gas diffusion layer made of a fiber base material and placed on the catalyst layer. The manufacturing method comprises the steps of:

(a) providing a fiber base material as a base material for the gas diffusion layer;

(b) forming a water-repellent layer on one surface of the fiber base material;

(c) cutting an outer peripheral edge of the fiber base material, such that an outer peripheral edge of the gas diffusion layer is located inward of an outer peripheral edge of the catalyst layer; and (d) placing the fiber base material on the catalyst layer formed in advance on the electrolyte membrane such that the catalyst layer is in contact with the water-repellent layer and joining the fiber base material with the catalyst layer, so as to form the electrode layer.

The step (c) presses the fiber base material along an expected cutting line of the fiber base material before cutting the fiber base material to form a groove on surface of the fiber base material where the water-repellent layer penetrates inward of the fiber base material, and cuts the fiber base material along the groove.

The manufacturing method of this aspect enables the water-repellent layer to cover the outer peripheral end face and the catalyst layer-side face of the gas diffusion layer, while adjusting the direction of fluffing on the outer peripheral end face of the base material for the gas diffusion layer to the direction opposite to the catalyst layer-side. This protects the electrolyte membrane from being damaged by the fluffs that are present on the surface of the base material for the gas diffusion layer. In the membrane electrode assembly manufactured by this manufacturing method, the catalyst layer-side face of the gas diffusion layer is made smaller in size than the gas diffusion layer-side face of the catalyst layer. This prevents the gas diffusion layer from being in direct contact with the electrolyte membrane and prevents degradation of the electrolyte membrane caused by the hydrogen peroxide radical.

An Eleventh Aspect:

According to an eleventh aspect, there is provided a manufacturing method of a membrane electrode assembly for a fuel cell, wherein the membrane electrode assembly has an electrode layer that includes a catalyst layer arranged to be in contact with an electrolyte membrane and a gas diffusion layer placed on the catalyst layer. The manufacturing method comprises the steps of:

(a) providing an electrolyte membrane with the catalyst layer formed on one surface thereof;
(b) providing a fiber base material, which is smaller in size than the catalyst layer, as a base material for the gas diffusion layer;
(c) placing the fiber base material on the catalyst layer, such that an outer peripheral edge of the fiber base material is located inward of an outer peripheral edge of the catalyst layer; and
(d) joining the catalyst layer and the fiber base material with the electrolyte membrane by hot pressing, and utilizing heat shrinkage-induced deformation of the electrolyte membrane and the catalyst layer to fold a protruded area of the catalyst layer and the electrolyte membrane, which is protruded outward of the fiber base material, toward a fiber base material-side and thereby form a locking element that serves to prevent the catalyst layer from being separated from the fiber base material.

The manufacturing method of this aspect provides the locking element for preventing separation of the catalyst layer from the gas diffusion layer in the membrane electrode assembly by utilizing heat shrinkage-induced deformation by hot pressing. This accordingly enables the membrane electrode assembly that prevents separation of the catalyst layer from the gas diffusion layer to be manufactured with high efficiency.

A Twelfth Aspect:

According to a twelfth aspect, there is provided the manufacturing method of the eleventh aspect, wherein the step (d) may provide a first electrolyte membrane and a second electrolyte membrane, each having the catalyst layer and the fiber base material stacked one upon the other, and may make the first electrolyte membrane and the second electrolyte membrane placed one upon the other subject to hot-pressing, so as to join the catalyst layer with the fiber base material and join the first electrolyte membrane with the second electrolyte membrane.

This manufacturing method enables the locking element using the outer peripheral edges of the electrolyte membrane and the catalyst layer to be efficiently provided in the two electrode layers of the membrane electrode assembly.

The invention may be implemented by any of various applications, for example, a membrane electrode assembly for a fuel cell, a fuel cell using the membrane electrode assembly, a fuel cell system including the fuel cell and a vehicle with the fuel cell system mounted.

BRIEF DESCRIPTION OF DRAWINGS

FIGS. 2A and 2B are respectively a schematic diagram illustrating the structure of a membrane electrode assembly as a reference example and a diagram illustrating degradation of an electrolyte membrane in the membrane electrode assembly;

FIG. 11 is a schematic diagram illustrating the structure of a fuel cell according to a fifth embodiment;

FIGS. 15A and 15B are schematic diagrams illustrating the structures of fuel cells as other configuration examples of the fifth embodiment;

FIG. 27 is a schematic diagram illustrating the structure of a fuel cell as another configuration example according to the seventh embodiment.

DESCRIPTION OF EMBODIMENTS

A. First Embodiment

Figure 1:
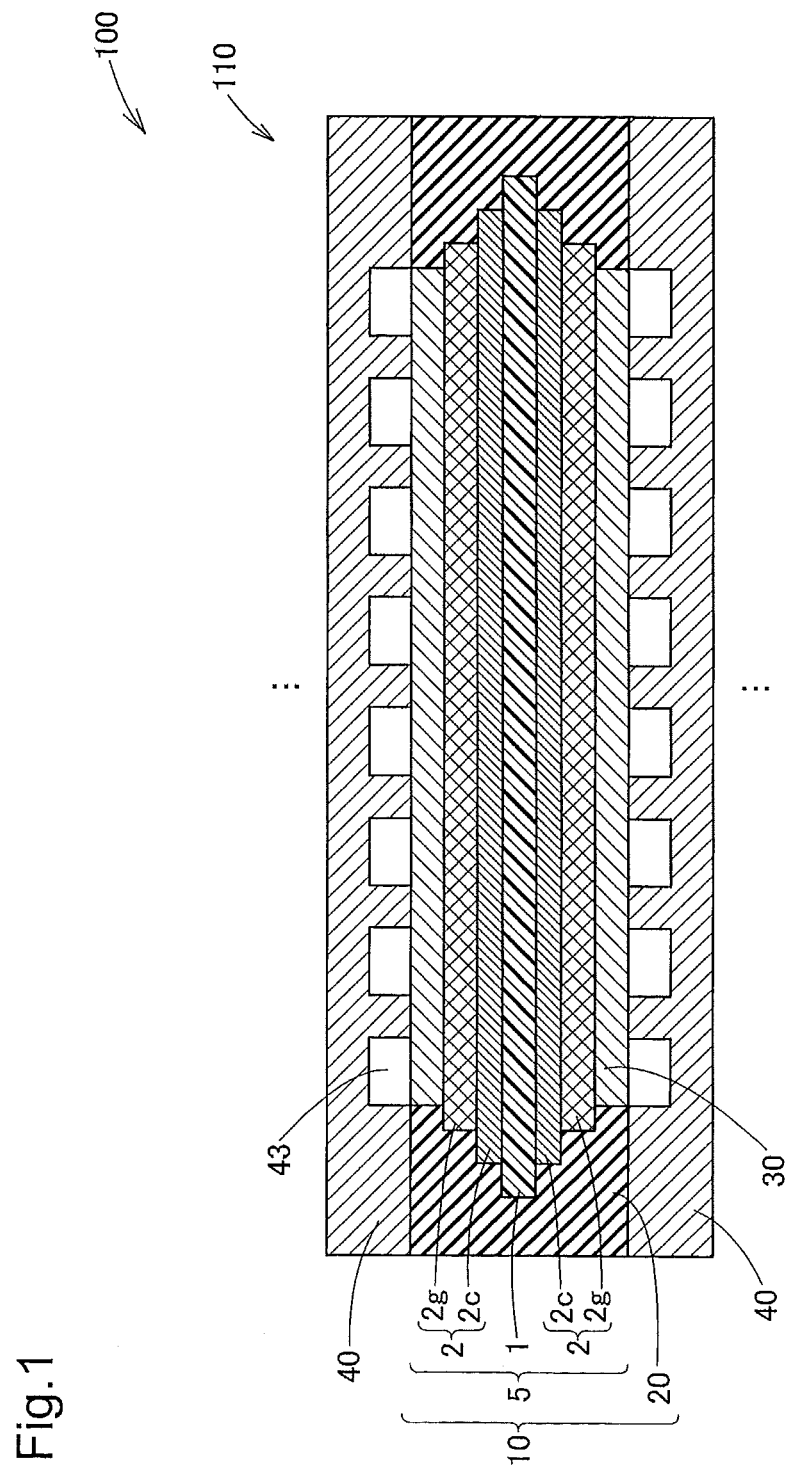
FIG. 1 is a schematic diagram illustrating the structure of a fuel cell.

FIG. 1 is a schematic diagram illustrating the structure of a fuel cell according to one embodiment of the invention. This fuel cell 100 is provided as a polymer electrolyte fuel cell that generates electricity with received supplies of hydrogen and oxygen as reactive gases. The fuel cell 100 has the stack structure by stacking a plurality of unit cells 110 one upon another. The unit cell 100 has a seal-integrated membrane electrode assembly 10 and two separators 40 that are placed across the seal-integrated membrane electrode assembly 10.

The seal-integrated membrane electrode assembly 10 includes a membrane electrode assembly 5 and a seal member 20 placed at the outer peripheral edge of the membrane electrode assembly 5. The membrane electrode assembly 5 is provided as a power generation device where electrodes 2 having gas diffusivity are integrated with and arranged on both sides of an electrolyte membrane 1 having good proton conductivity in the wet state. The electrode 2 has a catalyst layer 2c, supporting a catalyst (for example, platinum (Pt)) for accelerating the fuel cell reaction and a gas diffusion layer 2g, formed to diffuse the reactive gas over the whole electrode plane.

An ion exchange membrane of a fluororesin may be used for the electrolyte membrane 1. The catalyst layer 2c, may be formed by applying catalyst ink on the outer surface of the electrolyte membrane 1 and drying the applied catalyst ink, wherein the catalyst ink is a mixed solution by dispersing catalyst-support carbon and an electrolyte that is the same type of compound as the catalyst membrane in an aqueous solvent or an organic solvent. Alternatively the catalyst layer 2c, may be formed by transferring a catalyst layer formed in advance on the surface of a film substrate, onto the surface of the electrolyte membrane 1.

The gas diffusion layer 2g, may be made of a porous fiber base material having electrical conductivity, gas permeability and gas diffusivity, such as carbon fiber or graphite fiber. The electrode 2 is formed by placing the base material for the gas diffusion layer 2g, on the catalyst layer 2c formed in advance on the electrolyte membrane 1 and joining together by, for example, hot pressing.

In the membrane electrode assembly 5 according to this embodiment, the gas diffusion layer 2g, of the electrode 2 is made smaller in size than the catalyst layer 2c, so that the outer peripheral edge of the gas diffusion layer 2g, is located inward of the outer peripheral edge of the catalyst layer 2c, and thereby the circumferential edge of the catalyst layer 2c, is exposed. The reason why the outer peripheral edge of the gas diffusion layer 2g, of the electrode is structured to be located inward of the outer peripheral edge of the catalyst layer 2c, will be described later.

The seal member 20 is provided by injection molding a resin material to cover the outer peripheral edges of the electrolyte membrane 1 and the electrodes 2 of the membrane electrode assembly 5. The seal member 20 is placed between separators 40, so that seal lines are formed between the seal member 20 and the respective separators 40. These seal lines prevent the reactive gas from leaking out of the fuel cell 100. The seal member 20 may be formed by any method other than the method of injection molding the resin material. For example, the seal member 20 may be formed by injecting and solidifying a resin material having adhesion property.

In the fuel cell 100 according to this embodiment, the outer peripheral edge of the electrolyte membrane 1 is protruded from the outer peripheral edges of the catalyst layers 2c, and the protruded outer peripheral edge is covered with the seal member 20. This structure effectively prevents cross leakage of the reactive gas across the outer peripheral edges of the electrolyte membrane 1 and the electrodes 2. Manifolds for the reactive gases and a coolant are formed in the seal member 20, although not being specifically illustrated or described.

The separator 40 may be made of a gas-impermeable plate member having electrical conductivity (for example, metal plate). Flow channels 43 for the reactive gas are formed over the entire power generation area (area surrounded by the seal member 20) on the electrode 2-side face of the separator 40. Manifolds for the reactive gases and the coolant and flow channels for the coolant are also formed in the separator 40, although not being specifically illustrated or described.

In the unit cell 110, a gas passage member 30 is placed between the separator 40 and the electrode 2 to spread over the reactive gas in the flow channels 43 to the entire gas diffusion layer 2g. The gas passage member 30 also serves as an electrically conductive path between the membrane electrode assembly 5 and the separator 40. The gas passage member 30 may be made of a metal plate, such as expanded metal or punched metal, processed to be porous or may be made of a porous material having electrical conductivity, such as carbon sintered body.

Either one or both of the two gas passage members 30 may be omitted. In this case, however, it is preferable that the flow path wall of the flow channels 43 formed on the outer surface of the separator 40 is in direct contact with the gas diffusion layer 2g, of the electrode 2. The flow channels 43 formed on either one or both of the two separators 40 may be omitted.

FIG. 2A is a schematic diagram illustrating the structure of a membrane electrode assembly 5a, as a reference example of the invention. This membrane electrode assembly 5a, is substantially similar to the membrane electrode assembly 5 according to the embodiment, except the difference in structure of electrodes 2a. In the electrode 2a, of the reference example, the gas diffusion layer 2g, is made larger in size than the catalyst layer 2c, so that the outer peripheral edge of the gas diffusion layer 2g, is in direct contact with the electrolyte membrane 1.

FIG. 2B is a diagram illustrating degradation of the electrolyte membrane 1 in the membrane electrode assembly 5a, of the reference example. FIG. 2B schematically illustrates the proximity of the outer peripheral edge of the membrane electrode assembly 5a, included in a fuel cell. The gas diffusion layer 2g, is made of the fiber base material as mentioned above, so that fluffs 2f, that are very small projections are present on its outer surface or more specifically on the outer peripheral edge. When the gas diffusion layer 2g, is in direct contact with the electrolyte membrane 1 as in the case of the membrane electrode assembly 5a, of the reference example, the fluffs 2f, of the gas diffusion layer 2g, are stuck into the electrolyte membrane 1. This may cause cross leakage of the reactive gas or a short circuit of the electrodes 2.

During power generation in the fuel cell, hydrogen may be transmitted through the electrolyte membrane and migrated to the cathode side, or oxygen may be transmitted through the electrolyte membrane and migrated to the anode side. Such transmission and migration of the reactive gas may cause hydrogen and oxygen to be present simultaneously on the same electrode side and react with each other to produce hydrogen peroxide ($H_2O_2$). The produced hydrogen peroxide in the membrane electrode assembly may be radicalized to degrade the electrolyte membrane.

The hydrogen peroxide radical produced by radicalizing hydrogen peroxide is likely to be converted to water and oxygen by the action of the catalyst in the catalyst layer and disappear. In the membrane electrode assembly 5a, of the reference example, however, there is an area on the outer periphery of the catalyst layer 2c,, where the electrolyte membrane 1 is in direct contact with the gas diffusion layer 2g. In this area, the hydrogen peroxide radical is thus likely to arrive at the electrolyte membrane 1 without disappearing by the catalytic action and degrade the electrolyte membrane 1.

Figure 3A:
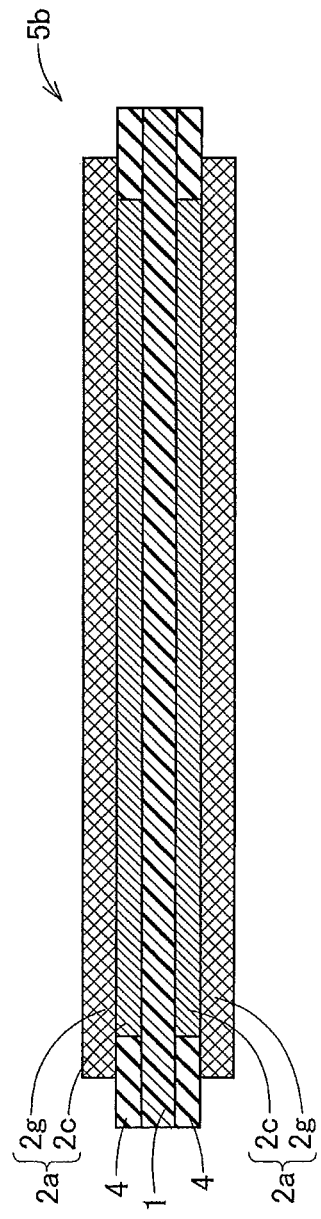
FIGS. 3A and 3B are respectively a schematic diagram illustrating the structure of a membrane electrode assembly as another reference example and a diagram illustrating damage of the electrolyte membrane by the presence of protective sheets.

FIG. 3A is a schematic diagram illustrating the structure of a membrane electrode assembly 5b, as another reference example of the invention. The structure of FIG. 3A is substantially similar to the structure of FIG. 2A, except that protective sheets 4 are provided on the outer peripheries of the catalyst layers 2c. In the membrane electrode assembly 5b, of this reference example, protective sheets 4 for protecting the electrolyte membrane 1 are located on the outer peripheries of the catalyst layers 2c, and the outer peripheral edges of the gas diffusion layers 2g, are placed on the respective protective sheets 4. In other words, in the membrane electrode assembly 5b,, the presence of the protective sheets 4 prevents the gas diffusion layers 2g, from being in direct contact with the electrolyte membrane 1. The protective sheets 4 may be made of a resin material, such as polyethylene naphthalate (PEN).

Figure 3B:
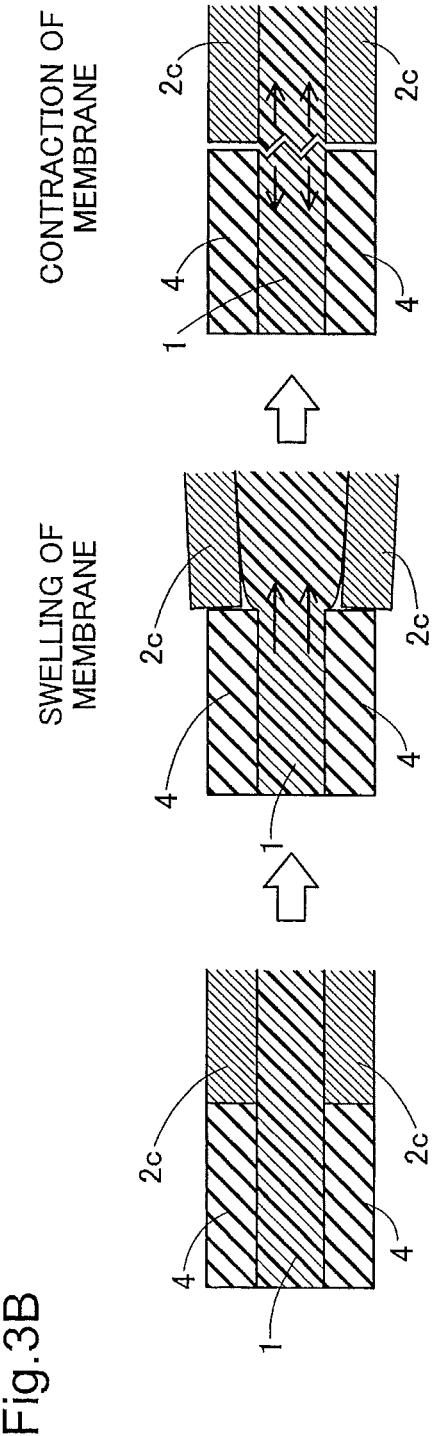

FIG. 3B is a diagram illustrating damage of the electrolyte membrane 1 by the presence of the protective sheets 4. FIG. 3B illustrates gradual change in the state of the membrane electrode assembly 5b, included in a fuel cell during power generation. FIG. 3B illustrates only part of the membrane electrode assembly 5b,, with omitting the gas diffusion layers 2g, and the other components of the fuel cell but the membrane electrode assembly 5b from the illustration.

During power generation of the fuel cell, the membrane electrode assembly has high temperature (for example, about 80° C.) and a large amount of water is produced in the power generation area. This leads to swelling of the electrolyte membrane. In the electrolyte membrane 1 of the membrane electrode assembly 5b, of the reference example, however, the presence of the protective sheets 4 prevents the peripheral area placed between the protective sheets 4 from being swollen but allows the center area surrounded by the protective sheets 4 to be swollen. When the electrolyte membrane 1 starts swelling, a stress in the direction of pulling toward the center area is generated in the peripheral area of the electrolyte membrane 1 placed between the protective sheets 4. This may cause breakage of the membrane.

When the power generation of the fuel cell is stopped and the swelling electrolyte membrane 1 starts contracting, the presence of the protective sheets 4 interferes with contraction of the electrolyte membrane 1. In the electrolyte membrane 1, a stress is accordingly generated in the direction of separating the peripheral area placed between the protective sheets 4 from the center area surrounded by the protective sheets 4. This may also cause breakage of the membrane.

Figure 4:
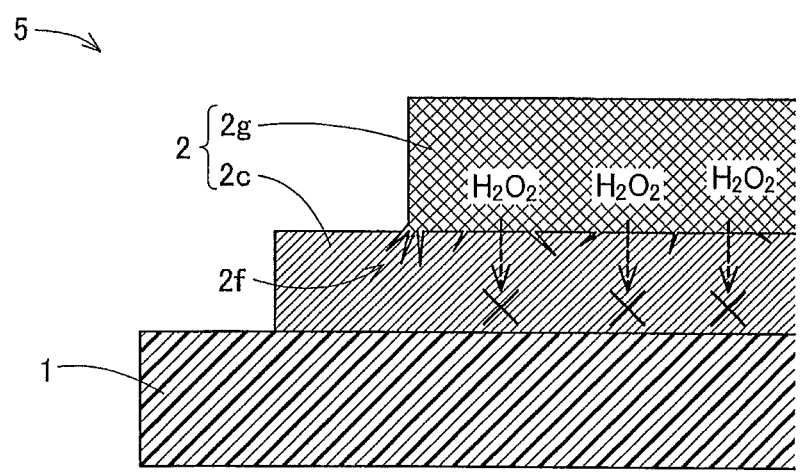
FIG. 4 is a diagram illustrating the advantageous effect of preventing degradation of the electrolyte membrane in the membrane electrode assembly.

FIG. 4 is a diagram illustrating the advantageous effect of preventing degradation of the electrolyte membrane 1 in the membrane electrode assembly 5 according to the embodiment. FIG. 4 schematically illustrates the proximity of the peripheral edge of the membrane electrode assembly 5 included in the fuel cell 100. FIG. 4 illustrates only one of the electrodes 2 of the membrane electrode assembly 5, with omitting the other electrode 2 from the illustration. The other components of the fuel cell 100 are also omitted from the illustration of FIG. 4.

In the membrane electrode assembly 5 of the embodiment, the outer peripheral edge of the gas diffusion layer 2g, is located inward of the outer peripheral edge of the catalyst layer 2c,, so that the catalyst layer 2c, prevents fluffs 2f, of the gas diffusion layer 2g, from being stuck into the electrolyte membrane 1. In other words, the catalyst layer 2c, serves as the protective layer of the electrolyte membrane 1. Even when hydrogen peroxide is produced and radicalized in the electrode 2, the catalytic action of the catalyst layer 2c, converts the hydrogen peroxide radical into oxygen and water and thereby prevents the hydrogen peroxide radical from arriving at the electrolyte membrane 1.

As described above, the fuel cell 100 according to this embodiment has the membrane electrode assembly 5, wherein the outer peripheral edge of the gas diffusion layer 2g, is located inward of the outer peripheral edge of the catalyst layer 2c. This structure prevents the gas diffusion layer 2g from being in direct contact with the electrolyte membrane 1. This accordingly prevents the electrolyte membrane 1 from being damaged or degraded by the fluffs of the gas diffusion layer 2g, or by the hydrogen peroxide radical.

B. Second Embodiment

Figure 5:
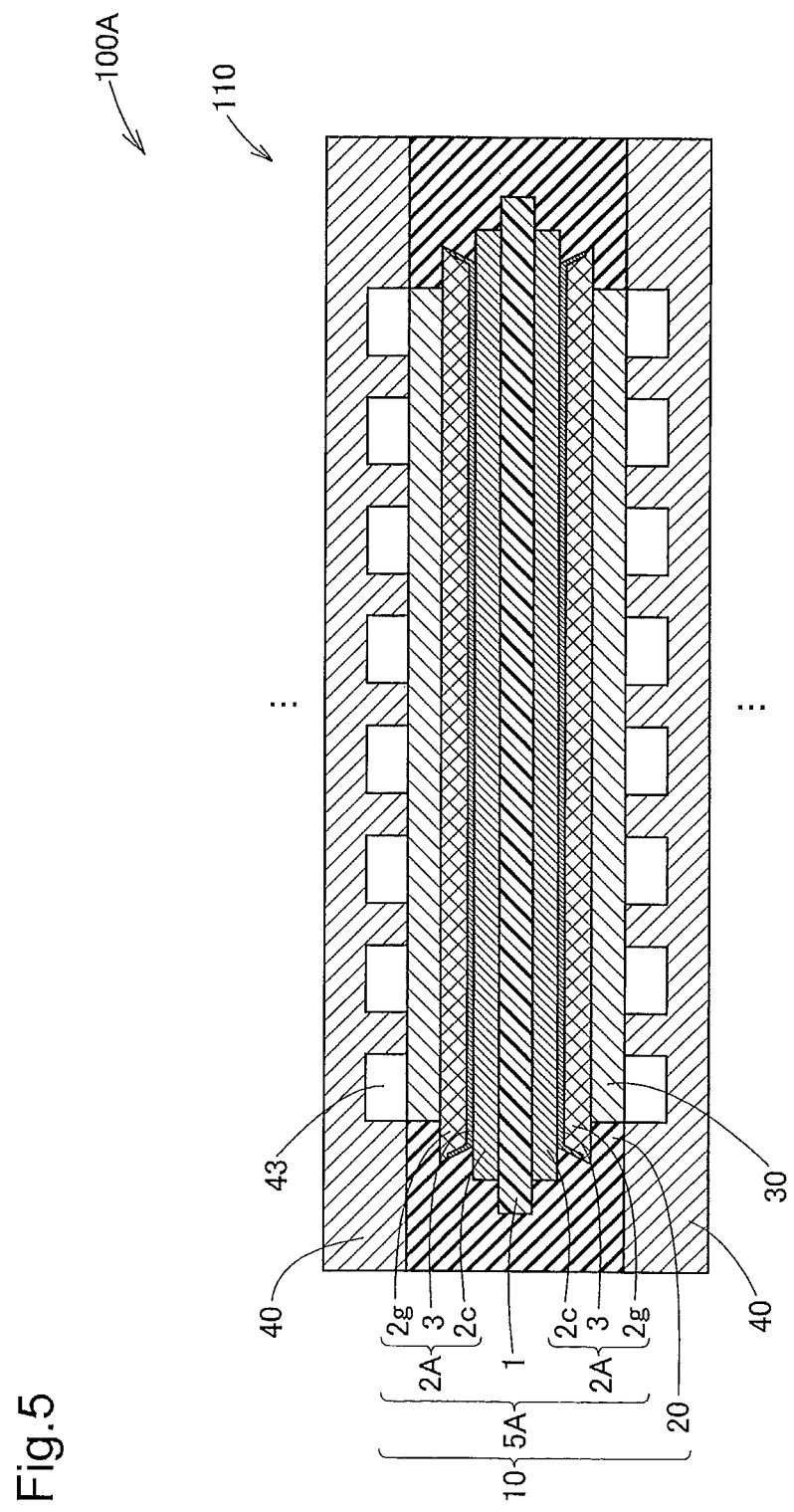
FIG. 5 is a schematic diagram illustrating the structure of a fuel cell according to a second embodiment.

FIG. 5 is a schematic diagram illustrating the structure of a fuel cell 100A according to a second embodiment of the invention. The structure of FIG. 5 is substantially similar to the structure of FIG. 1, except the difference in structure of electrodes 2A. In a membrane electrode assembly 5A of this fuel cell 100A, the outer peripheral edge of a gas diffusion layer 2g, is formed to have an inclined face that is substantially tapered toward a catalyst layer 2c-side. In other words, the end face of the gas diffusion layer 2g is arranged to form an acute angle with the surface of the gas diffusion layer 2g, on the catalyst layer 2c-side. A water-repellent layer 3 is provided on the outer surface of the gas diffusion layer 2g. The water repellent layer 3 covers the catalyst layer 2c-side surface of the gas diffusion layer 2g, and part of the outer peripheral edge of the gas diffusion layer 2g.

Figure 6A:
FIGS. 6A to 6F are diagrams sequentially illustrating a process of forming an electrode.
Figure 6B:

FIGS. 6A to 6F are diagrams sequentially illustrating a process of forming the electrode 2A. Although FIGS. 6A to 6F show the process of forming only one electrode 2A, the other electrode 2A is formed by the similar process, which is not specifically illustrated or described. A first step provides the electrolyte membrane 1 (FIG. 6A). A second step applies the catalyst ink similar to that described in the first embodiment on the outer surface of the electrolyte membrane 1 and dries and solidifies the applied catalyst ink to form the catalyst layer 2c, (FIG. 6B).

Figure 6C:
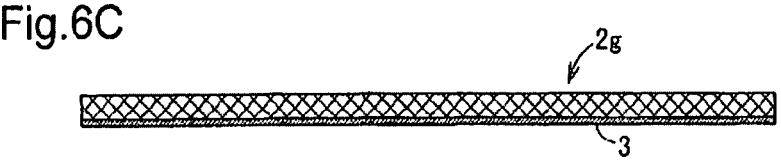

A third step provides the base material for the gas diffusion layer 2g (FIG. 6C). The base material for the gas diffusion layer 2g, is a fiber base material that is similar to that described in the first embodiment. According to this embodiment, the water-repellent layer 3 is formed over the entire surface of the base material for the gas diffusion layer 2g,, which is to be in contact with the catalyst layer 2c. The water-repellent layer 3 may be formed as a water-repellent thin film (microporous layer (MPL), which contains a water-repellent resin material such as polytetrafluoroethylene (PTFE) and an electrically conductive material such as carbon black as the main components, on the surface of the base material for the gas diffusion layer 2g.

As described in FIG. 5, in the electrode 2A completed, the water-repellent layer 3 is placed between the diffusion layer 2g, and the catalyst layer 2c. Providing the water-repellent layer 3 between the gas diffusion layer 2g, and the catalyst layer 2c, favorably keeps the electrolyte membrane 1 in the wet state during operation of the fuel cell 100, while preventing the pores of the gas diffusion layer 2g, from being blocked by the water content. The water-repellent layer 3 of the fuel cell 100A also has the function of protecting the electrolyte membrane 1, which will be described in detail later.

A fourth step cuts the outer peripheral edge of the base material for the gas diffusion layer 2g,, such that the size of the gas diffusion layer 2g, is made smaller than the size of the catalyst layer 2c. This cutting step is performed as the following two-step process. More specifically, the process first presses the water-repellent layer 3-side surface of the base material for the gas diffusion layer 2g, along an expected cutting line with a pressing tool 200 to form a groove 6 running on the expected cutting line (FIG. 6D), before cutting the outer peripheral edge. This process of forming the groove 6 presses the surface of the gas diffusion layer 2g,, such that the water-repellent layer 3 penetrates inward of the gas diffusion layer 2g, to form the inner wall surface of the groove 6.

Figure 6D:
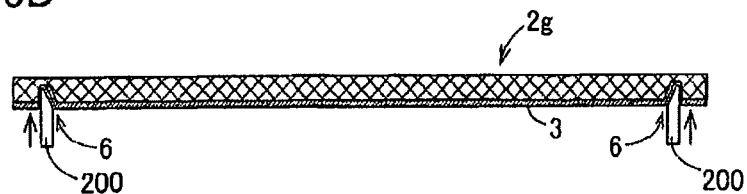
Figure 6E:
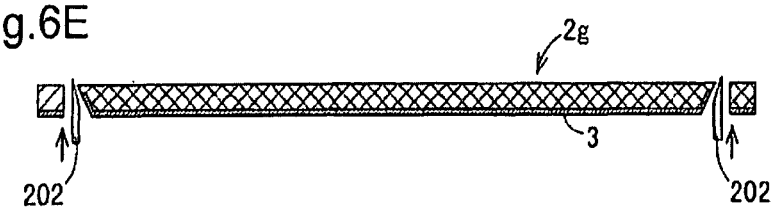
Figure 6F:
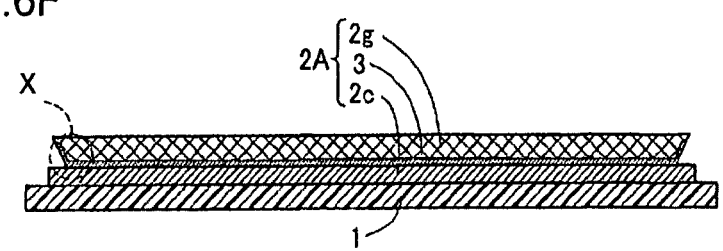

The process subsequently cuts the bottom face of the groove 6 with a cutting tool 202 (FIG. 6E). The process of FIGS. 6D and 6E makes the size of the base material for the gas diffusion layer 2g, smaller than the size of the catalyst layer 2c, and forms the outer peripheral end face of the gas diffusion layer 2g, to have an inclined surface partly covered with the water-repellent layer 3. A fifth step places the base material for the gas diffusion layer 2g on the catalyst layer 2c, to be joined together, such that the water-repellent layer 3 is in contact with the catalyst layer 2c, (FIG. 6F). This forms the electrode 2A on the electrolyte membrane 1.

Figure 7:
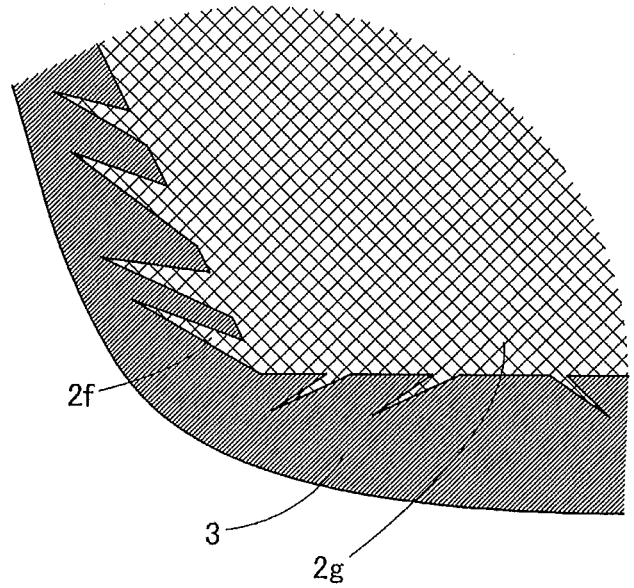
FIG. 7 is a diagram illustrating an edge of a base material for a gas diffusion layer.

FIG. 7 is a diagram illustrating the edge of the base material for the gas diffusion layer 2g in a broken-line area X of FIG. 6F. As mentioned previously, fluffs 2f, are present on the outer surface of the base material for the gas diffusion layer 2g, or more specifically on its outer peripheral edge. The water-repellent layer 3 is, however, provided to cover the electrolyte membrane 1-side surface and the outer peripheral end face of the gas diffusion layer 2g, so that the fluffs 2f, are covered by the water-repellent layer 3. This structure effectively prevents the fluffs 2f, from being stuck into the electrolyte membrane 1 via the catalyst layer 2c and damaging the electrolyte membrane 1 when the gas diffusion layer 2g, is joined with the catalyst layer 2c.

The water-repellent layer 3 is thus regarded to function together with the catalyst layer 2c, as the protective layer for protecting the electrolyte membrane 1. Especially in the membrane electrode assembly 5A, the water-repellent layer 3 covers the outer peripheral end face of the gas diffusion layer 2g, and thereby protects the electrolyte membrane 1 from being damaged by the fluffs 2f, present on the outer peripheral edge of the gas diffusion layer 2g.

Before cutting the outer peripheral edge of the gas diffusion layer 2g, the formation process of the electrode 2A inserts the water-repellent layer 3 inward of the gas diffusion layer 2g, to form the groove 6 described in FIG. 6D. This step adjusts the direction of fluffing at the outer peripheral edge of the gas diffusion layer 2g, toward the bottom face of the groove 6 (i.e., outward of the electrode 2A). This further effectively protects the electrolyte membrane 1 from being damaged by sticking of the fluffs 2f.

Figure 8:
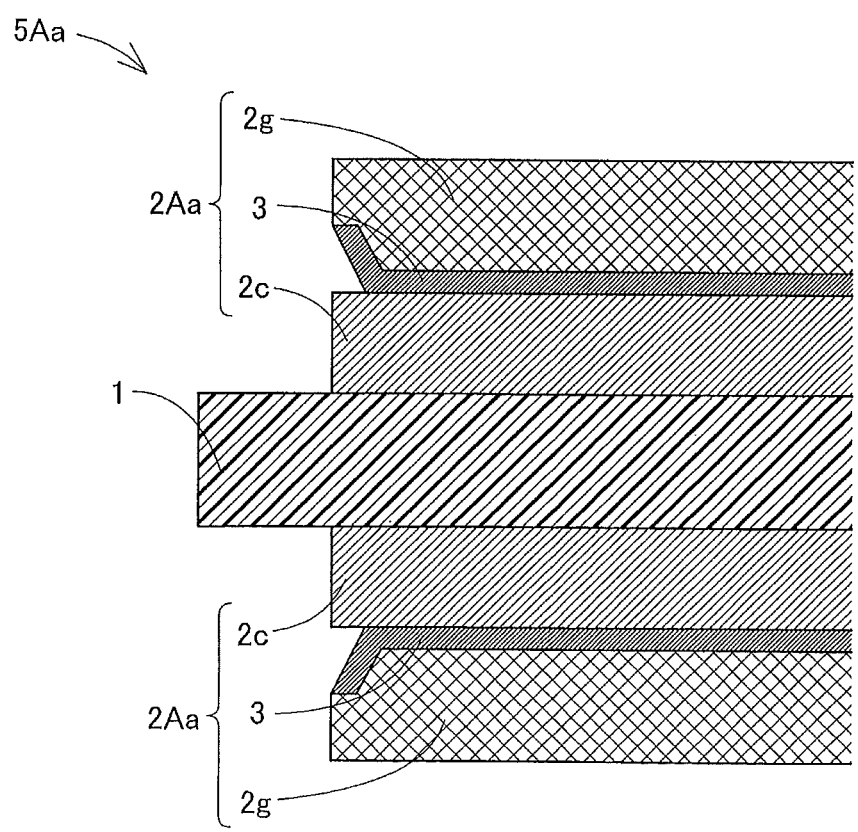
FIG. 8 is a diagram illustrating an outer peripheral edge of a membrane electrode assembly as another configuration example according to the second embodiment.

FIG. 8 is a diagram illustrating the outer peripheral edge of a membrane electrode assembly 5Aa as another configuration example according to the second embodiment. The structure of this membrane electrode assembly 5Aa is substantially similar to the structure of the membrane electrode assembly 5A described above, except the following points. In an electrode 2Aa of the membrane electrode assembly 5Aa, a gas diffusion layer 2g, and a catalyst layer 2c, are formed in substantially the same size. The outer peripheral edge of the gas diffusion layer 2g, however, has an inclined surface of a water-repellent layer 3 formed by pressing the corner of the catalyst layer 2c. In the membrane electrode assembly 5Aa, this makes the gas diffusion layer 2g-side face of the catalyst layer 2c, larger in size than the catalyst layer 2c-side face of the gas diffusion layer 2g, and causes the outer peripheral edge of the gas diffusion layer 2g, to be located inward of the outer peripheral edge of the catalyst layer 2c. In this structure, the water-repellent layer 3 also protects the electrolyte membrane 1 from fluffs of the gas diffusion layer 2g.

Like the membrane electrode assembly 5 of the first embodiment, the circumferential edge surface of the catalyst layer 2c, is exposed on the gas diffusion layer 2g, in this membrane electrode assembly 5Aa. This exposed surface and the end faces of the catalyst layer 2c, and the gas diffusion layer 2g, are covered with the seal member 20 (not shown). This structure also prevents the hydrogen peroxide radical from being migrated from the gas diffusion layer 2g, to the electrolyte membrane 1 without the catalyst layer 2c and thereby prevents degradation of the electrolyte membrane 1.

As described above, in the membrane electrode assemblies 5A and 5Aa according to the second embodiment, the presence of the water-repellent layer 3 and the processed outer peripheral edge of the gas diffusion layer 2g, effectively protects the electrolyte membrane from being damaged by sticking of the fluffs of the gas diffusion layer 2g. This structure also prevents degradation of the electrolyte membrane 1 by the hydrogen peroxide radical.

C. Third Embodiment

Figure 9:
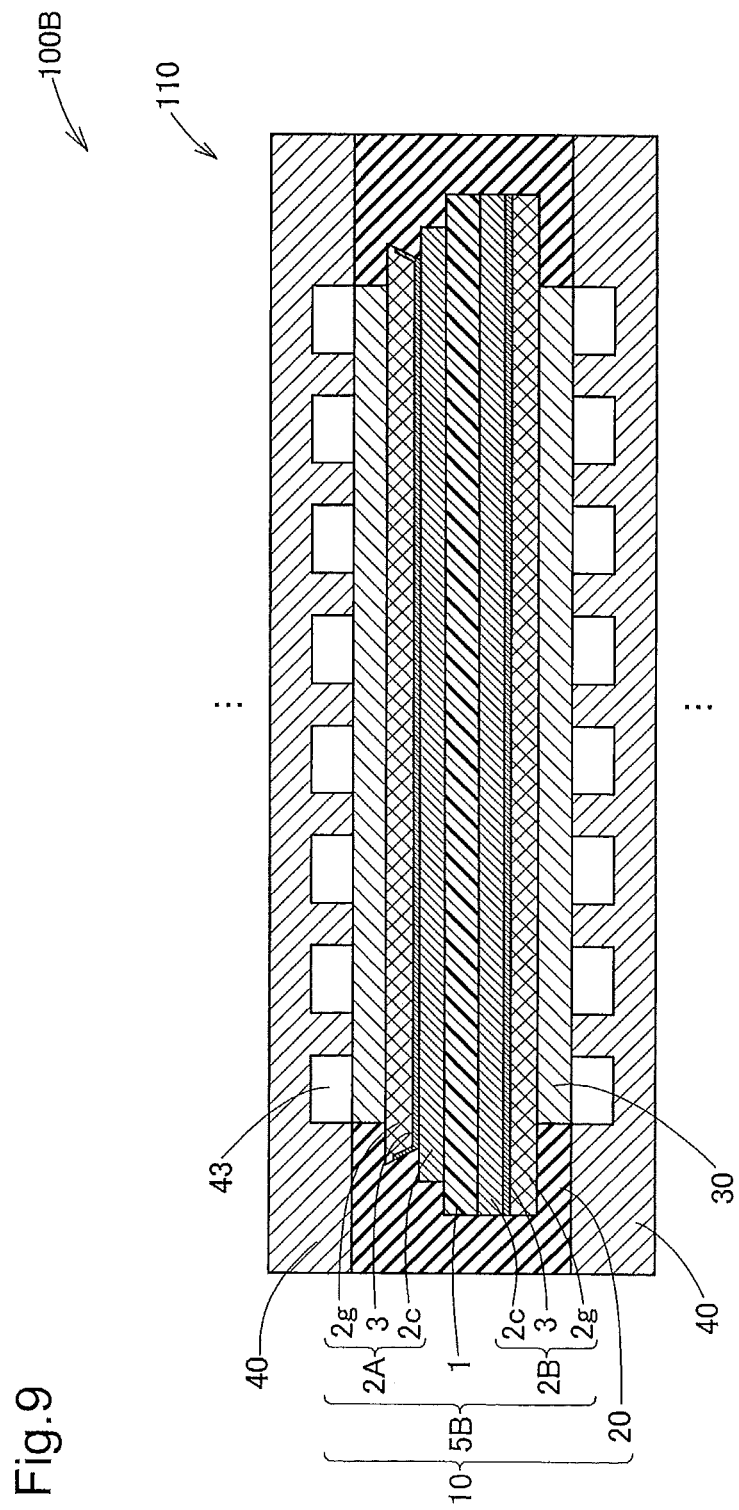
FIG. 9 is a schematic diagram illustrating the structure of a fuel cell according to a third embodiment.

FIG. 9 is a schematic diagram illustrating the structure of a fuel cell 100B according to a third embodiment of the invention. The structure of FIG. 9 is substantially similar to the structure of FIG. 5, except that an electrode 2B having an outer peripheral edge of different structure from that of the electrode 2A is formed on one face of a membrane electrode assembly 5B. In the electrode 2B formed on one face of the membrane electrode assembly 5B, a catalyst layer 2c, a gas diffusion layer 2g, and a water-repellent layer 3 are formed in substantially the same size as that of an electrolyte membrane 1. The electrolyte membrane 1, the catalyst layer 2c, the water-repellent layer 3 and the gas diffusion layer 2g, are accordingly stacked one upon the other to have the respective end faces substantially aligned. In this fuel cell 100B, oxygen and hydrogen are supplied to the electrode 2A serving as the cathode and the electrode 2B serving as the anode. The water-repellent layer 3 of the electrode 2B may be omitted.

According to this embodiment, the outer peripheral edge of the gas diffusion layer 2g, is located inward of the outer peripheral edge of the catalyst layer 2c, only on the side of the electrode 2A. This structure also effectively protects the electrode 2-A-side of the electrolyte membrane 1 from being damaged or degraded. In this structure, the outer peripheral edge of the electrode 2B serves as the support of the outer peripheral edge of the electrolyte membrane 1. This effectively protects the electrolyte membrane 1 from being damaged during the assembling process of the membrane electrode assembly 5B, for example, during the step of providing the seal member 20 on the outer periphery of the membrane electrode assembly 5B.

D. Fourth Embodiment

Figure 10:
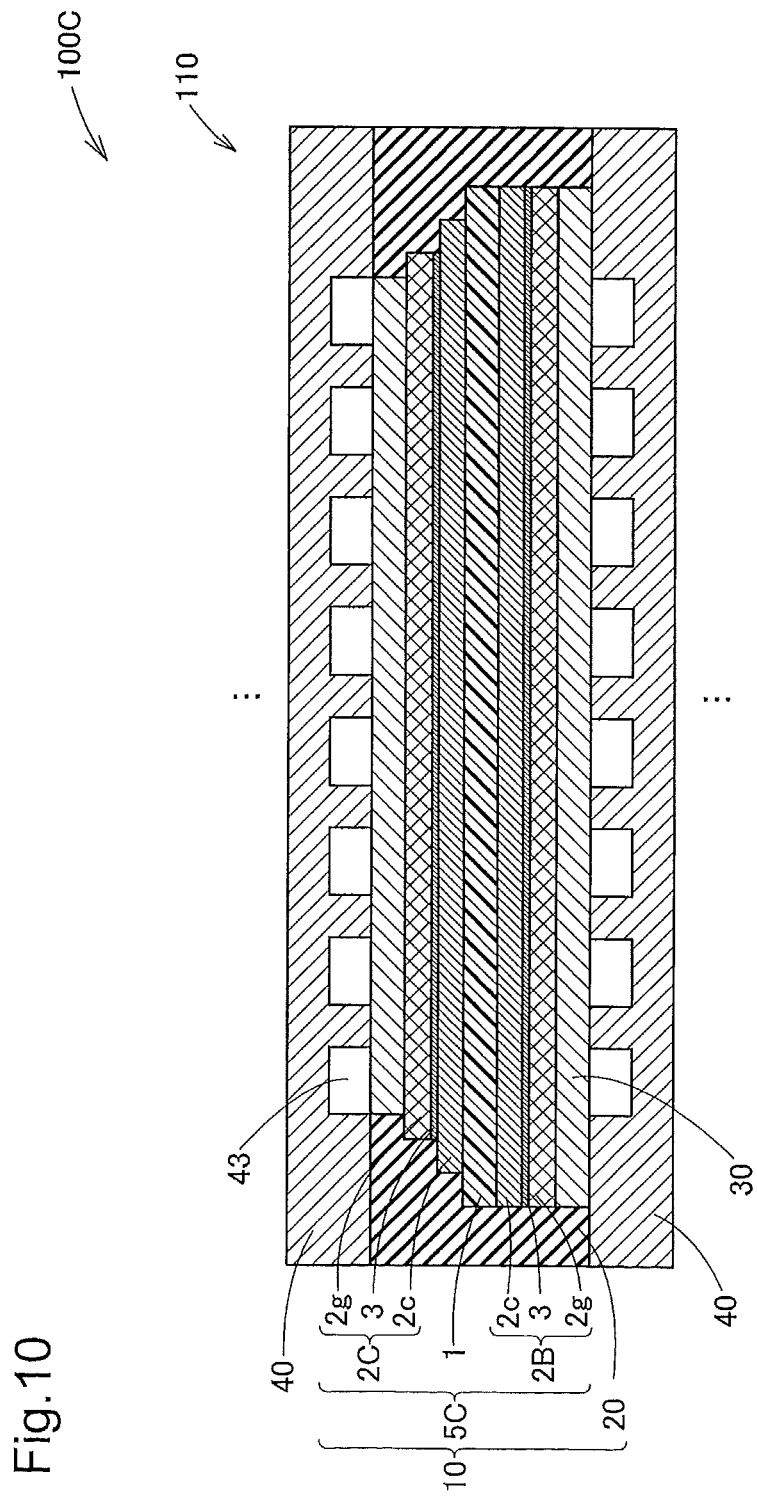
FIG. 10 is a schematic diagram illustrating the structure of a fuel cell according to a fourth embodiment.

FIG. 10 is a schematic diagram illustrating the structure of a fuel cell 100C according to a fourth embodiment of the invention. The structure of FIG. 10 is substantially similar to the structure of FIG. 9, except that the electrode 2A serving as the anode is replaced with an electrode 2C having an outer peripheral edge of different structure in a membrane electrode assembly 5C. In the membrane electrode assembly 5C of the fuel cell 100C, the outer peripheral end face of a gas diffusion layer 2g, is not inclined but is formed as a surface substantially perpendicular to the outer surface of a catalyst layer 2c.

According to this embodiment, the outer peripheral edge of the gas diffusion layer 2g, is located inward of the outer peripheral edge of the catalyst layer 2c, on the side of the electrode 2C. This structure also effectively protects the electrode 2C-side of the electrolyte membrane 1 from being damaged or degraded. The presence of a water-repellent layer 3 provided between the gas diffusion layer 2g, and the electrolyte membrane 1 also prevents the electrolyte membrane 1 from being damaged or degraded in the same manner as that of the above embodiment. According to the structure of the fourth, embodiment, part or all of the outer peripheral end face of the gas diffusion layer 2g, may be covered with the water-repellent layer 3.

E. Fifth Embodiment

FIG. 11 is a schematic diagram illustrating the structure of a fuel cell 100D according to a fifth embodiment of the invention. The structure of FIG. 11 is substantially similar to the structure of FIG. 9, except that the two electrodes 2A and 2B are respectively impregnated with adhesive materials 7. The range of a seal area SA is also illustrated in FIG. 11. The fuel cell 100D includes a membrane electrode assembly 5D having the two electrode layers 2A and 2B respectively impregnated with the adhesive materials 7. The adhesive material 7 works to prevent the gas diffusion layer 2g, from being separated from the catalyst layer 2c.

The adhesive material 7 may be made of the same type of compound as the solid electrolyte of the electrolyte membrane 1 or may be made of an adhesive that is able to be impregnated into the pores. More specifically, a Nafion (registered trademark) solution manufactured by DuPont (e.g., trade name: Nafion DE2020) or a bonding agent manufactured by Konishi Co., Ltd. (e.g., trade name: MOST) may be used for the adhesive material 7.

Figure 12A:
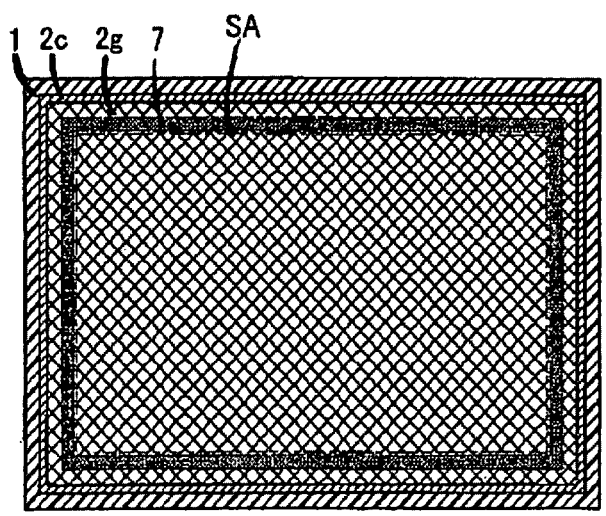
FIGS. 12A and 12B are schematic diagrams respectively illustrating areas of adhesive materials impregnated in two electrodes.
Figure 12B:
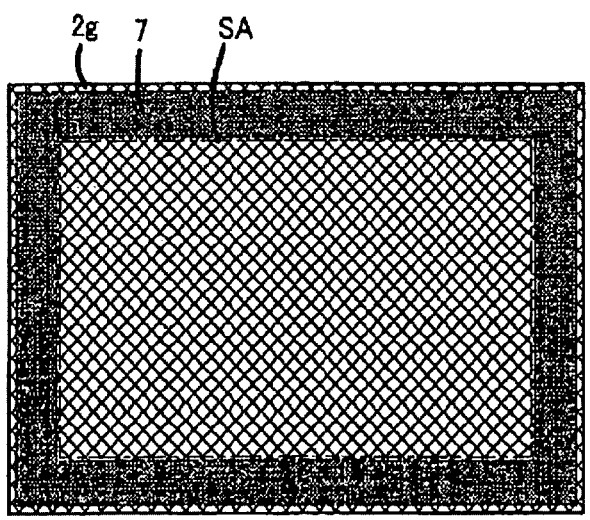

FIGS. 12A and 12B are schematic diagrams illustrating the areas of the two electrodes 2A and 2B respectively impregnated with the adhesive materials 7. FIG. 12A shows the outer surface of the electrode 2A viewed along the direction perpendicular to the electrode surface. FIG. 12B shows the outer surface of the electrode 2B viewed along the direction perpendicular to the electrode surface. In FIGS. 12A and 12B, the location areas of the adhesive materials 7 are shown by the similar hatching to that of FIG. 11. In FIGS. 12A and 12B, the seal area SA surrounded by the seal member 20 on the outer surface of each of the electrodes 2A and 2B is shown by the dot-dash line.

In each of the two electrodes 2A and 2B, the circumferential area surrounding the seal area SA is impregnated with the adhesive material 7. The adhesive material 7 in the fluid state is supplied from the joining surfaces of the gas diffusion layer 2g, and the catalyst layer 2c, into the area shown in each of FIGS. 12A and 12B to be impregnated into the pores (gas cavities) of the water-repellent layer 3, the gas diffusion layer 2g, and the catalyst layer 2c. The adhesive material 7 may otherwise be impregnated into the pores of the water-repellent layer 3, the gas diffusion layer 2g, and the catalyst layer 2c, by screen printing.

Figure 13:
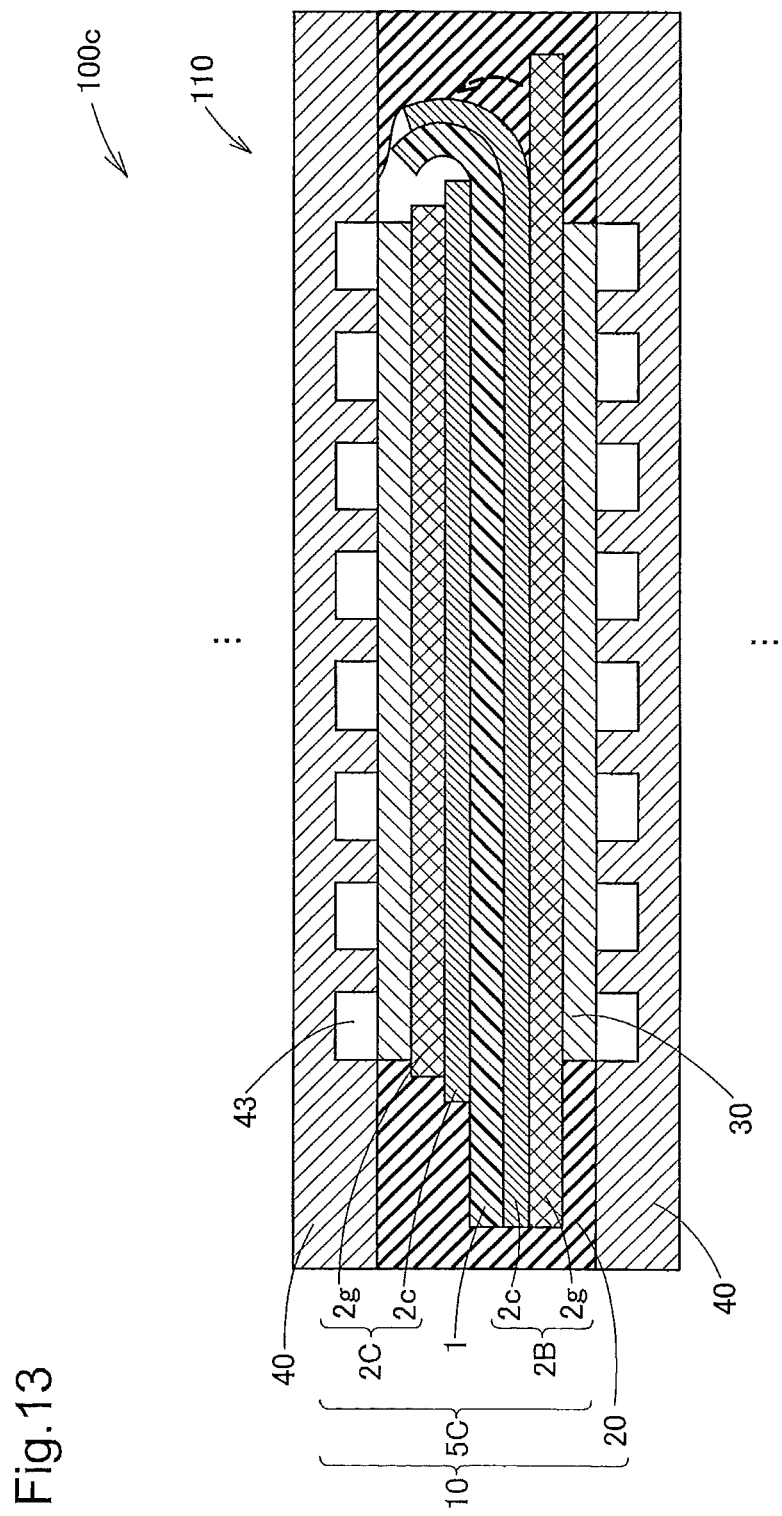
FIG. 13 is a diagram illustrating a defect caused by separation of the gas diffusion layer from the catalyst layer.

FIG. 13 is a diagram illustrating a defect caused by separation of the gas diffusion layer 2g, from the catalyst layer 2c. A fuel cell 100c, as a reference example is shown in FIG. 13. The structure of the fuel cell 100c, is similar to that of the fuel cell 100C of the fourth embodiment, except that the water-repellent layer 3 is omitted and that the catalyst layer 2c, and the gas diffusion layer 2g, of the electrode 2C are made smaller in size. FIG. 13 schematically illustrates the state that the gas diffusion layer 2g, is separated from the catalyst layer 2c, at the edge of the electrode 2B.

The electrolyte membrane 1 and the catalyst layer 2c, are likely to be deformed by heat shrinkage at high temperatures (for example, 100° C.). In general, the heat shrinkage rate of the electrolyte membrane 1 is higher than the heat shrinkage rate of the catalyst layer 2c. In the heating process, for example, at the step of forming the seal member 20, once the catalyst layer 2c, of the electrode 2B is separated from the gas diffusion layer 2g,, the electrolyte membrane 1 and the catalyst layer 2c, may be deformed and turned up toward the electrode 2C-side.

When the fuel cell 100c, is assembled using the catalyst layer 2c, and the gas diffusion layer 2g, deformed and turned in this manner, this facilitates leakage of the reactive gas from the electrode 2B-side to the electrode 2C-side in the area of deformation. This increases the potential for performance deterioration of the fuel cell 100c, and degradation of the electrolyte membrane 1.

Like the structure of the fuel cell 100c, of the reference example, in the structure of the fuel cell 100D of the fifth embodiment, the outer peripheral edges of the electrolyte membrane 1 and the electrode 2B are protruded from the outer peripheral edge of the electrode 2A. In the fuel cell 100D, however, the adhesive material 7 is impregnated into the outer peripheral edge of the electrode 2B, so as to prevent the gas diffusion layer 2g, and the water-repellent layer 3 from being separated from the catalyst layer 2c. In the manufacturing process of the fuel cell 100D, there is accordingly little possibility of deformation of the electrolyte membrane 1 and the catalyst layer 2c, described in FIG. 13.

Figure 14A:
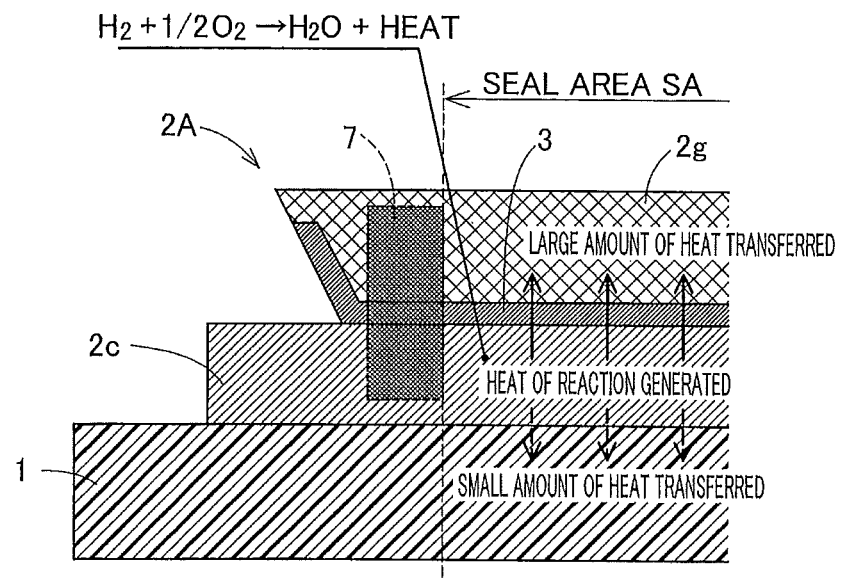
FIGS. 14A and 14B are diagrams illustrating the function of preventing degradation of the membrane electrode assembly by the presence of the adhesive material.
Figure 14B:
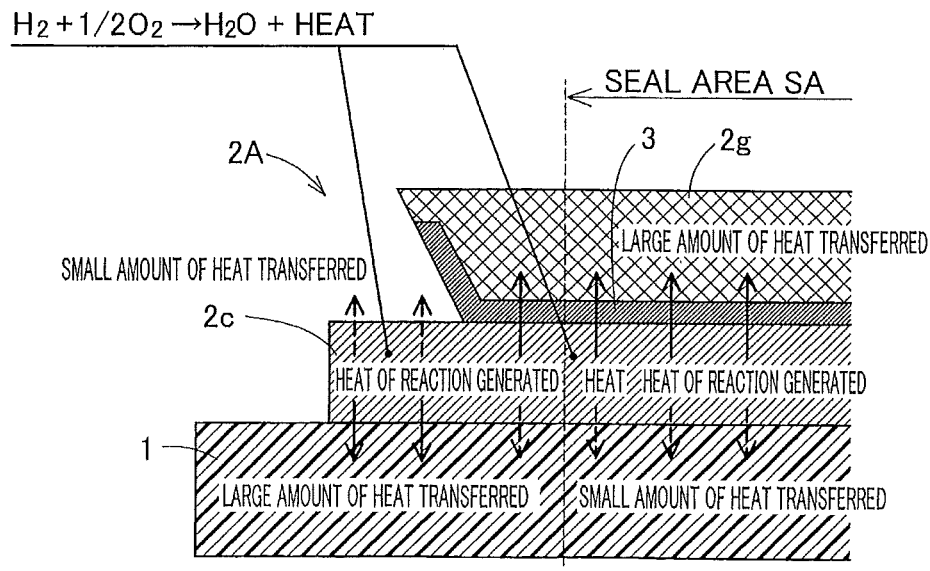

FIGS. 14A and 14B are diagrams illustrating the function of the adhesive material 7 to prevent degradation of the membrane electrode assembly 1 according to the fifth embodiment. FIG. 14A illustrates the respective edges of the electrolyte membrane 1 and the electrode 2A of the membrane electrode assembly 5D in the fuel cell 100D of the fifth embodiment, with omitting the other components of the fuel cell 100D from the illustration. The structure of FIG. 14B is substantially similar to the structure of FIG. 14A, except omission of the adhesive material 7.

The following reaction (A) proceeds on the electrode 2A as the power generating reaction:

$$H_2 + \tfrac{1}{2}O_2 \rightarrow H_2O \qquad (A)$$

This reaction is an exothermic reaction and causes heat of reaction to be generated in the catalyst layer 2c. Increasing the amount of reaction heat transferred toward the electrolyte membrane 1 accelerates degradation of the electrolyte membrane 1.

As described in FIG. 12, the adhesive material 7 is provided to surround the seal area SA. In this membrane electrode assembly 5D, the presence of the adhesive material 7 prevents the reactive gas from being diffused to the protruded area of the catalyst layer 2c, outside of the seal area SA and thereby prevents the heat of reaction from being generated in the protruded area (FIG. 14A). In the seal area SA, the catalyst layer 2c, is placed adjacent to the gas diffusion layer 2g, and the water-repellent layer 3 having the relatively high thermal conductivity. The heat of reaction generated in the catalyst layer 2c, within the seal area SA is accordingly transferred to the gas diffusion layer 2g. This advantageously prevents degradation of the electrolyte membrane 1.

In the structure with omitting the adhesive material 7, on the other hand, an increased amount of the reactive gas is diffused to the outer peripheral edge of the catalyst layer 2c, that is protruded from the outer peripheral edge of the gas diffusion layer 2g, (FIG. 14B). This increases the amount of reaction heat generated in the specific area where the catalyst layer 2c, is not adjacent to the gas diffusion layer 2g, or the water-repellent layer 3 but is in direct contact with the seal member 20. The seal member 20 made of the resin material has relatively low thermal conductivity, so that the increased amount of reaction heat is transferred toward the electrolyte membrane 1 in this specific area. This may accelerate degradation of the electrolyte membrane 1 by the heat of reaction in this specific area.

As described above, in the membrane electrode assembly 5D according to the fifth embodiment, the presence of the adhesive material 7 prevents the reactive gas from being diffused to the protruded area of the catalyst layer 2c, outside of the seal area SA and thereby prevents the heat of reaction from being generated in the protruded area. This advantageously prevents degradation of the electrolyte membrane 1.

FIG. 15A is a schematic diagram illustrating the structure of a fuel cell 100Da as another configuration example according to the fifth embodiment. The structure of FIG. 15A is substantially similar to the structure of FIG. 11, except that the adhesive materials 7 are impregnated into the entire outer peripheral edges of the electrodes 2A and 2B outside of the seal area SA. In the electrodes 2A and 2B of this configuration example, the entire interior of the outer peripheral edges of the catalyst layer 2c and the gas diffusion layer 2g, may be impregnated with the adhesive material 7 by the dipping process that soaks the outer peripheral edges of the catalyst layer 2c and the gas diffusion layer 2g, with the water-repellent layer 3 in a liquid phase of the adhesive material 7. This configuration example more effectively prevents the catalyst layer 2c, from being separated from the gas diffusion layer 2g. This configuration example also more effectively prevents the electrolyte membrane 1 from being degraded by the heat of reaction generated in the outer peripheral edge of the catalyst layer 2c, of the electrode 2A.

FIG. 15B is a schematic diagram illustrating the structure of a fuel cell 100Db as yet another configuration example according to the fifth embodiment. The structure of FIG. 15B is substantially similar to the structure of FIG. 10, except that the adhesive materials 7 are provided in the similar manner to the fuel cell 100D of the fifth embodiment. In the structure of the fuel cell 100C described in the fourth embodiment, the electrodes 2C and 2B may be impregnated with the adhesive materials 7. Like the fuel cell 100D of the fifth embodiment, this configuration example effectively prevents the gas diffusion layer 2g, from being separated from the catalyst layer 2c, and prevents degradation of the electrolyte membrane 1 by the heat of reaction.

F. Sixth Embodiment

Figure 16:
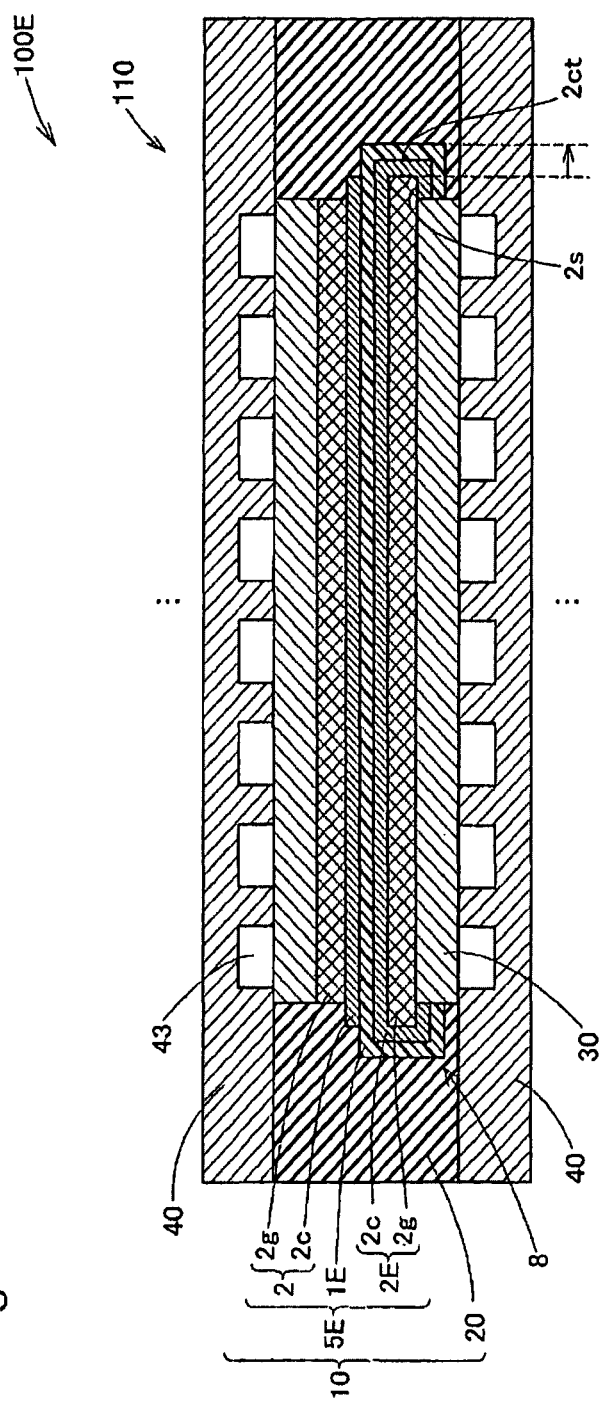
FIG. 16 is a schematic diagram illustrating the structure of a fuel cell according to a sixth embodiment.

FIG. 16 is a schematic diagram illustrating the structure of a fuel cell 100E according to a sixth embodiment of the invention. The structure of FIG. 16 is substantially similar to the structure of FIG. 1, except that the electrode 2 on the lower side of the drawing is replaced with an electrode 2E having a locking element 8 provided on the outer peripheral edge. For convenience of illustration, the thickness of the electrolyte membrane 1 is reduced in FIG. 16, compared with FIG. 1.

A membrane electrode assembly 5E of this fuel cell 100E includes the first electrode 2 and the second electrode 2E. The first electrode 2 has the same structure as that described in the first embodiment, wherein the size of the gas diffusion layer 2g, is made smaller than the size of the catalyst layer 2c, and the outer peripheral edge of the gas diffusion layer 2g, is located inward of the outer peripheral edge of the catalyst layer 2c. Like the first electrode 2, the second electrode 2E has a gas diffusion layer 2g, made smaller in size than a catalyst layer 2c. The catalyst layer 2c, of the second electrode 2E is formed by applying the catalyst ink over the whole surface of the electrolyte membrane 1.

In the second electrode 2E, a gas-diffusion layer 2g-side surface 2s, of the catalyst layer 2cE protruded from the outer peripheral edge of the gas diffusion layer 2g, is folded along the outer peripheral edge of the gas diffusion layer 2g, to form the locking element 8. This locking element 8 works to prevent the catalyst layer 2cE from being separated from the gas diffusion layer 2g and is formed circumferentially along the outer periphery of the gas diffusion layer 2g.

As described above, in the fuel cell 100E according to the fifth embodiment, the electrolyte membrane 1 and the catalyst layer 2cE are subject to a change in shape to form the locking element 8, which works to prevent the catalyst layer 2cE from being separated from the gas diffusion layer 2g. This structure does not require addition of any separate component that works to prevent the catalyst layer 2cE from being separated from the gas diffusion layer 2g.

In this second electrode 2E, the catalyst layer 2cE also serves as the protective layer for the electrolyte membrane 1 against the gas diffusion layer 2g. An outer peripheral edge 2ct of the catalyst layer 2cE in the second electrode 2E is located at the outermost position in the area of the locking element 8. In this electrode 2E, it can thus be construed that the outer peripheral edge of the gas diffusion layer 2g, is located inward of the outer peripheral edge of the catalyst layer 2cE.

Figure 17A:
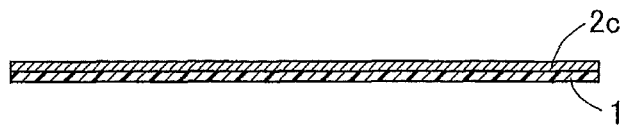
FIGS. 17A to 17D are diagrams sequentially illustrating a process of forming a locking element.

FIGS. 17A to 17D are diagrams sequentially illustrating a process of forming the locking element 8 in the second electrode 2E. FIG. 17A is a schematic cross sectional view of the electrolyte membrane 1 with the formed catalyst layer 2c. A first step applies the catalyst ink over the entire surface on one side of the electrolyte membrane 1 and dries the applied catalyst ink to form the catalyst layer 2c. The catalyst layer 2c, may otherwise be formed by transferring a catalyst layer formed in advance on a film substrate, onto the electrolyte membrane 1.

Figure 17B:
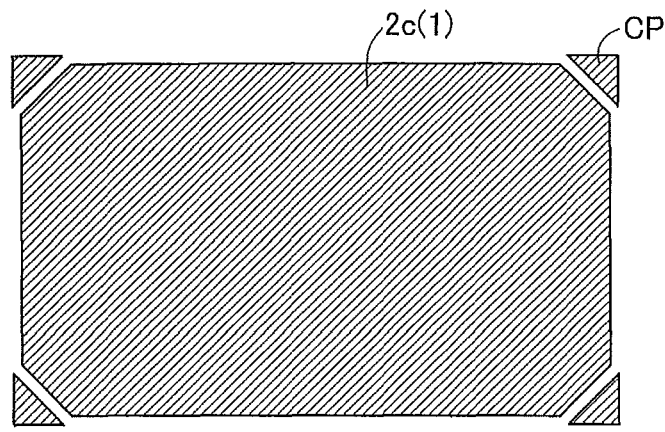

FIG. 17B is a diagram showing the electrolyte membrane 1 with the formed catalyst layer 2c, viewed from the catalyst layer 2c-forming surface of the electrolyte membrane 1. A second step cuts off four corners CP of the electrolyte membrane 1 with the formed catalyst layer 2c. Cutting off the four corners CP prevents the adjoining areas of the electrolyte membrane 1 and the catalyst layer 2c, forming the locking element 8 from overlapping each other on the surface of the gas diffusion layer 2g, in the completed locking element 8.

Figure 17C:
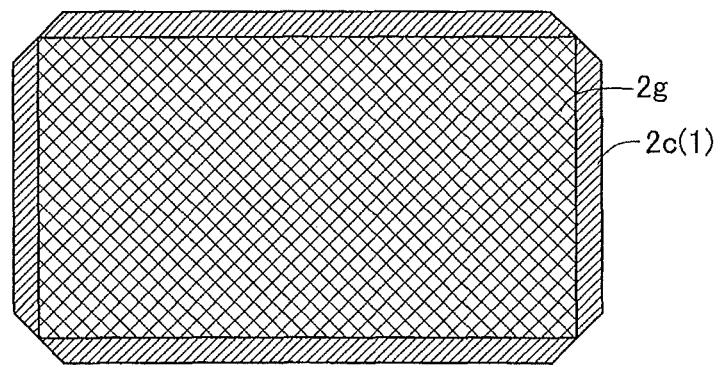
Figure 17D:
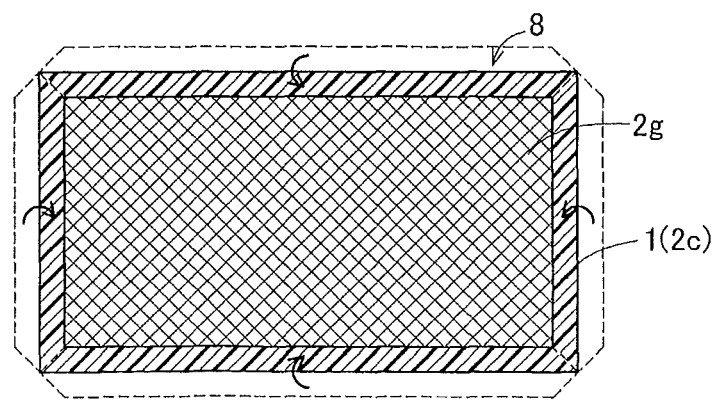

FIG. 17C schematically illustrates the state that the gas diffusion layer 2g, is located on the outer surface of the catalyst layer 2c. A third step positions the gas diffusion layer 2g, to be included in the outer surface of the catalyst layer 2c. FIG. 17D schematically illustrates the state that the outer peripheral edges of the electrolyte membrane 1 and the catalyst layer 2c, are folded to form the locking element 8. As a matter of convenience, the contour line of the outer peripheries of the electrolyte membrane 1 and the catalyst layer 2c, before the bending process is shown by the broken line in FIG. 17D.

A fourth step folds the protruded area of the catalyst layer 2c,, which is protruded from the outer peripheral edge of the gas diffusion layer 2g, together with the electrolyte membrane 1 toward the gas diffusion layer 2g-side, so as to form the locking element 8. As described in FIG. 17B, the corners CP of the electrolyte membrane 1 and the catalyst layer 2c, are cut off, so as to prevent the adjoining areas of the electrolyte membrane 1 and the catalyst layer 2c, forming the locking element 8 from overlapping each other.

Figure 18A:
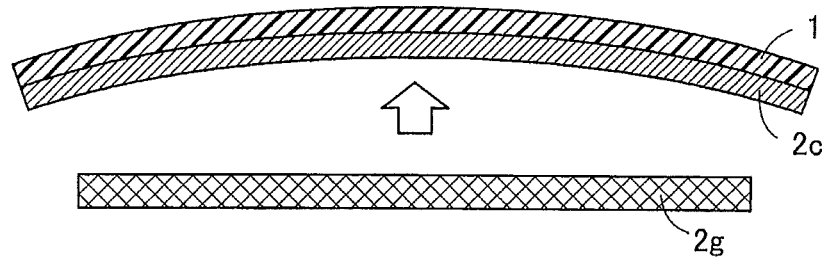
FIGS. 18A and 18B are diagrams sequentially illustrating another process of forming the locking element.
Figure 18B:
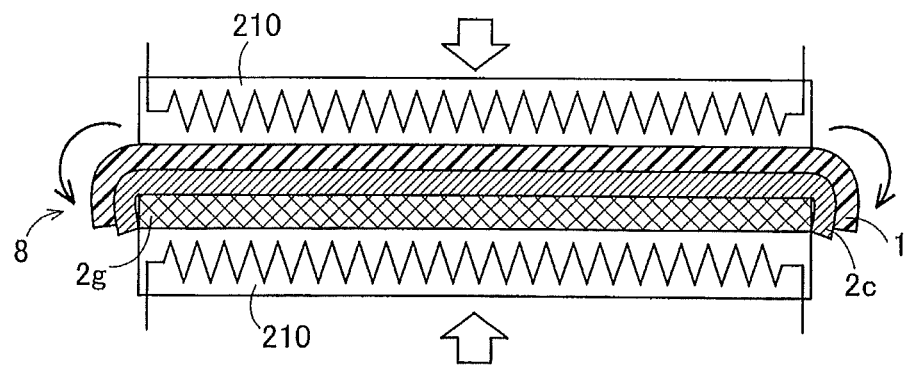

FIGS. 18A and 18B are diagrams sequentially illustrating another process of forming the locking element 8. FIG. 18A schematically illustrates a step of placing the gas diffusion layer 2g, on the electrolyte membrane 1 with the formed catalyst layer 2c. In this manufacturing process, the electrolyte membrane 1 with the catalyst layer 2c, formed on one face thereof is provided in such a thickness that can keep the curved shape convex toward the non-formation side of the electrolyte membrane 1. The gas diffusion layer 2g, is then placed on the concave surface of the catalyst layer 2c,, such that the outer peripheral edge of the gas diffusion layer 2g, is located inward of the outer peripheral edge of the catalyst layer 2c. In this manufacturing process, as described in FIG. 17B, it is preferable to cut off the four corners CP of the electrolyte membrane 1 and the catalyst layer 2c.

FIG. 18B schematically illustrates a hot pressing step of joining the catalyst layer 2c, with the gas diffusion layer 2g. This step presses and heats the electrolyte membrane 1 with the catalyst layer 2c, and the gas diffusion layer 2g, placed between a pair of hot plates 210, so as to join the catalyst layer 2c, with the gas diffusion layer 2g. The electrolyte membrane 1 is formed in the curved shape as described above. The outer peripheral edge of the electrolyte membrane 1 protruded from the outer peripheral edge of the gas diffusion layer 2g, is thus readily foldable toward the gas diffusion layer 2g-side by heat shrinkage of the electrolyte membrane 1 during the hot pressing process. At this step, the protruded outer peripheral edges of the electrolyte membrane 1 and the catalyst layer 2c, that are easily bendable are folded toward the gas diffusion layer 2g-side to form the locking element 8.

Unlike the structure shown in FIG. 16, the areas of the catalyst layer 2c, and the electrolyte membrane 1 that form the locking elements are not folded back to the opposite face of the gas diffusion layer 2g, opposite to the catalyst layer 2c-side face in the structure of FIG.18B. The locking element 8 may thus not be bent in a substantially U shape. The locking element 8 may not be formed to fully cover the outer peripheral end face of the gas diffusion layer 2g. The requirement is accordingly that the locking element 8 is formed by bending the electrolyte membrane 1 and the catalyst layer 2c, to such an extent that prevents the catalyst layer 2c, from being separated from the gas diffusion layer 2g.

The seal member 20 of the fuel cell 100E (FIG. 16) may be formed by the following procedure. The procedure locates the membrane electrode assembly 5E and the gas passage members 30 between the two separators 40 and places a gelled thermosetting resin on the outer periphery of the membrane electrode assembly 5E. The thermosetting resin is heated and cured to form the seal member 20. The seal member 20 may be formed by another procedure that prepares in advance a resin material formed in the shape of the seal member 20 and places and joins the resin material with the membrane electrode assembly 5E and the gas passage members 30 between the two separators 40.

Figure 19:
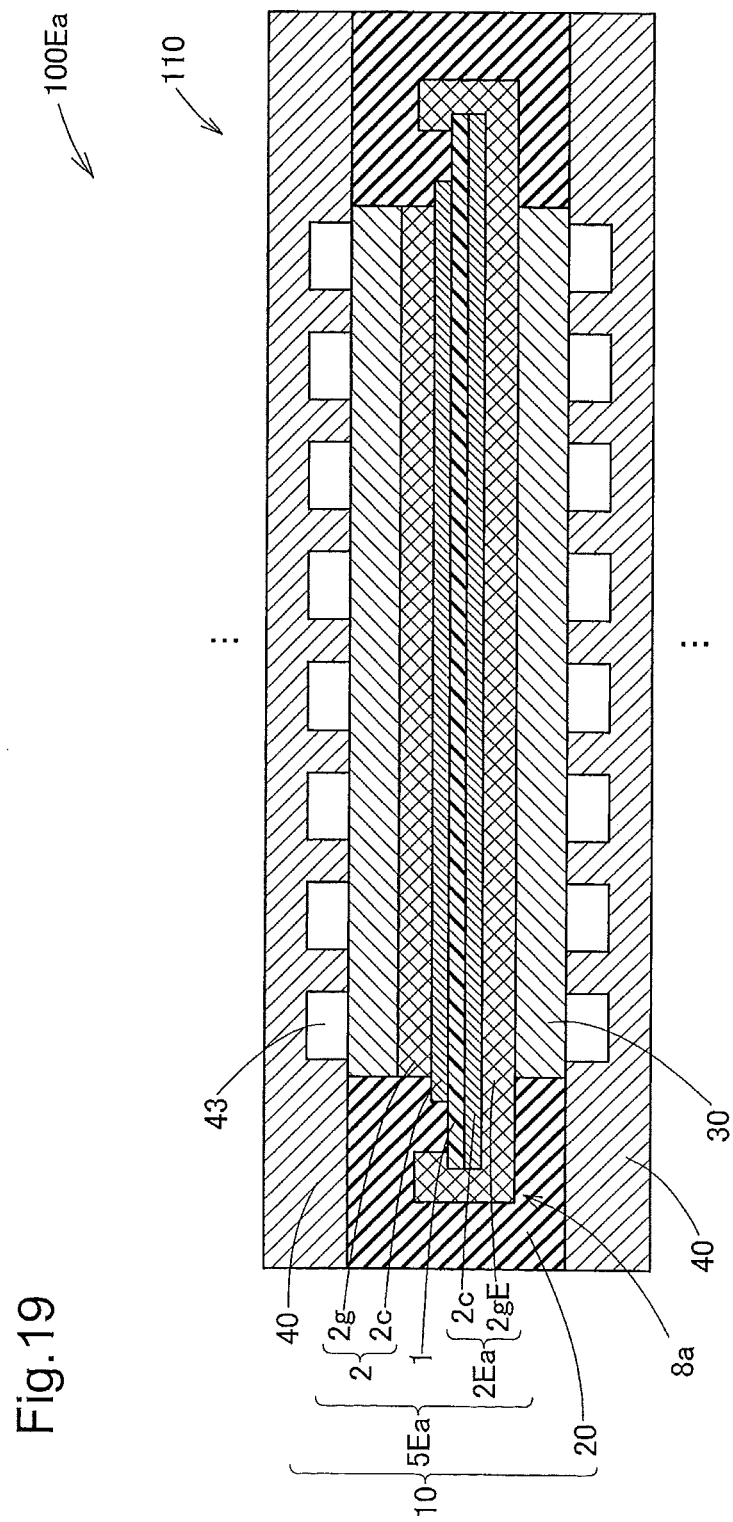
FIG. 19 is a schematic diagram illustrating the structure of a fuel cell as another configuration example according to the sixth embodiment.

FIG. 19 is a schematic diagram illustrating the structure of a fuel cell 100Ea as another configuration example according to the sixth embodiment. The structure of FIG. 19 is substantially similar to the structure of FIG. 16, except that the second electrode 2E is replaced with another second electrode 2Ea. A membrane electrode assembly 5Ea of this fuel cell 100Ea includes the first electrode 2 and the second electrode 2Ea of different structures. The first electrode 2 has the same structure as that of the electrode 2 included in the fuel cell 100E described in FIG. 16.

The second electrode 2Ea includes a catalyst layer 2c, formed to cover the entire surface on one side of the electrolyte membrane 1 and a gas diffusion layer 2gE formed to have the larger size than that of the catalyst layer 2c. A locking element 8a, is provided on the outer peripheral edge of the gas diffusion layer 2gE to prevent the gas diffusion layer 2gE from being separated from the catalyst layer 2c. More specifically, the locking element 8a, is formed by folding back the outer peripheral area of the gas diffusion layer 2gE, which is protruded from the outer peripheral edge of the catalyst layer 2c,, toward the first electrode 2-side to cover the outer peripheral edges of the electrolyte membrane 1 and the catalyst layer 2c. Like the catalyst layer 2c, and the electrolyte membrane 1 described in FIG. 17B, it is preferable to cut off four corners of the gas diffusion layer 2gE, for the purpose of easy formation of the locking element 8a.

As described above, providing the locking element 8a, by using the outer peripheral area of the gas diffusion layer 2gE also effectively prevents the gas diffusion layer 2gE from being separated from the catalyst layer 2c. In the structure with this locking element 8a,, it is preferable to securely seal the end face of the gas diffusion layer 2gE from the electrode 2 by the seal member 20. Such sealing effectively prevents cross leakage via the locking element 8a.

Figure 20:
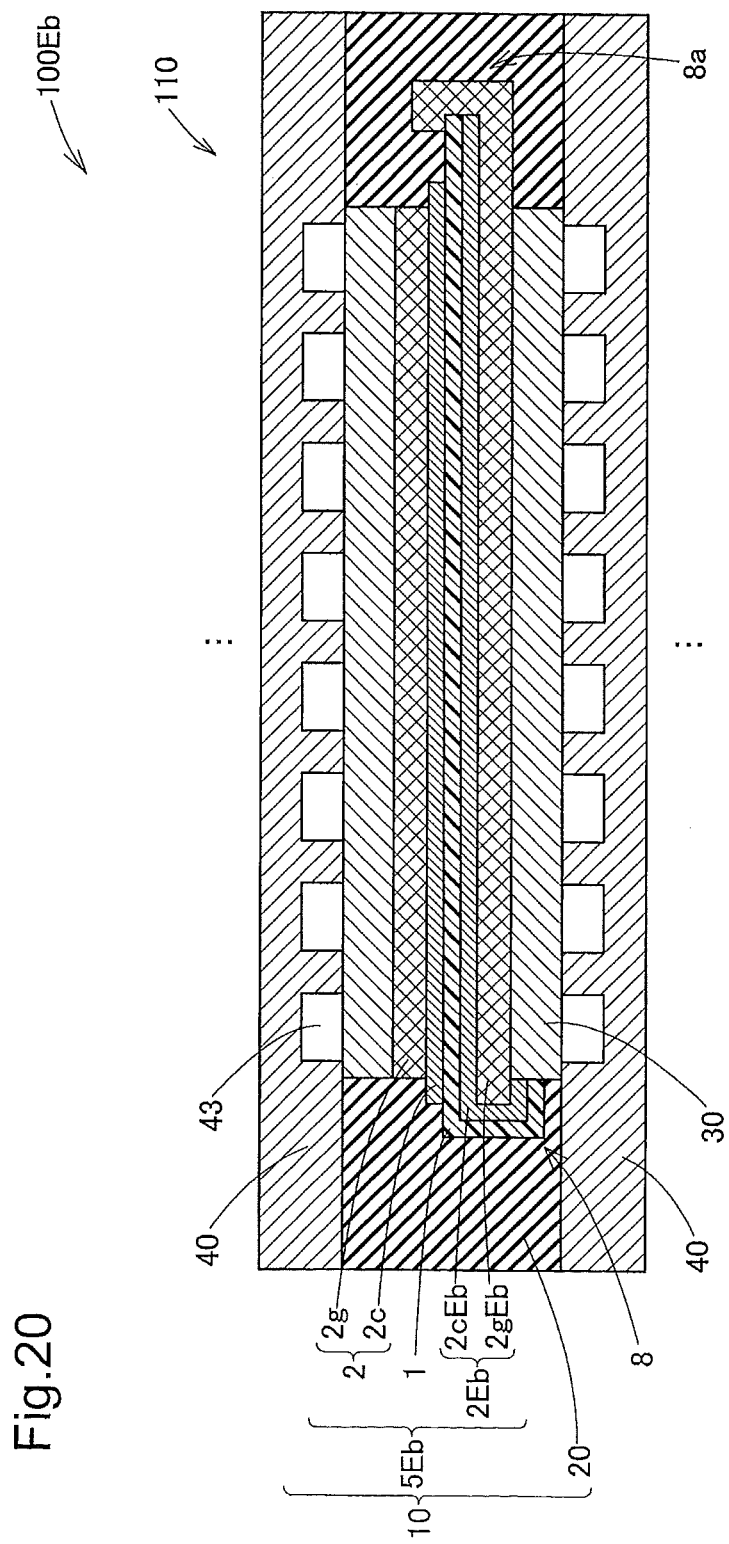
FIG. 20 is a schematic diagram illustrating the structure of a fuel cell as yet another configuration example according to the sixth embodiment.

FIG. 20 is a schematic diagram illustrating the structure of a fuel cell 100Eb as yet another configuration example according to the sixth embodiment. The structure of FIG. 20 is substantially similar to the structure of FIG. 19, except that the locking element 8a, on the left side of the drawing is replaced with the locking element 8 described in FIG. 16. A second electrode 2Eb of a membrane electrode assembly 5Eb of this configuration example includes a catalyst layer 2cEb and a gas diffusion layer 2gEb and has two locking elements 8 and 8a, of different structures.

Figure 21A:
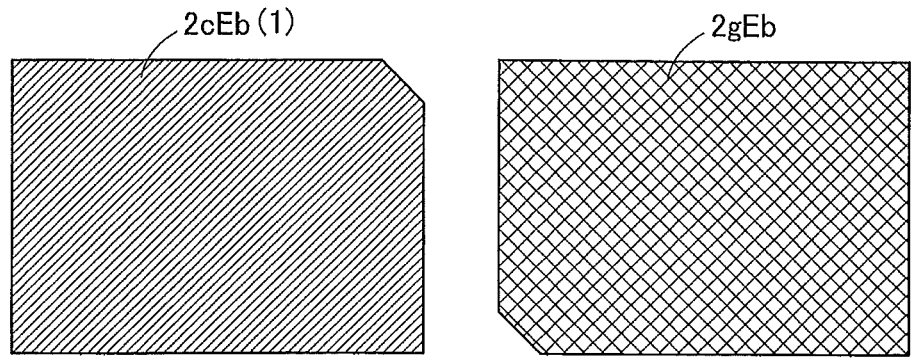
FIGS. 21A to 21C are diagrams sequentially illustrating a process of forming two locking elements of different structures.
Figure 21B:
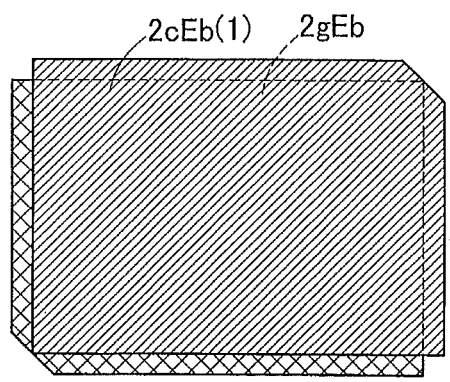
Figure 21C:
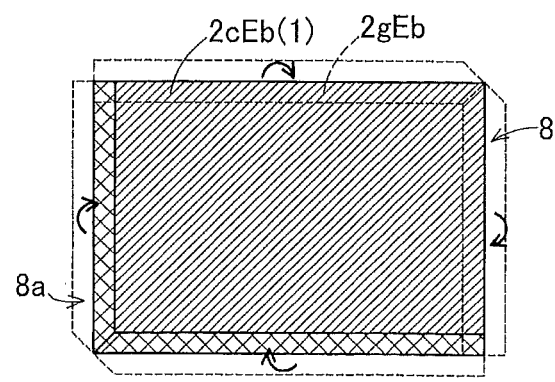

FIGS. 21A to 21C are diagrams sequentially illustrating a process of forming the two locking elements 8 and 8a, of different structures. FIG. 21A illustrates the catalyst layer 2cEb formed on the electrolyte membrane 1 and the gas diffusion layer 2gEb. A first step provides the catalyst layer 2cEb formed to cover the entire surface on one side of the electrolyte membrane 1, and the gas diffusion layer 2gEb. It is preferable that the catalyst layer 2cEb formed on the electrolyte membrane 1 and the gas diffusion layer 2gEb are provided in substantially the same size and are respectively formed with omission of one corner.

FIG. 21B illustrates the state that the catalyst layer 2cEb and the gas diffusion layer 2gEb are stacked one upon the other. A second step stacks the catalyst layer 2cEb and the gas diffusion layer 2gEb one upon the other with shifting the position of the catalyst layer 2cEb relative to the position of the gas diffusion layer 2gEb in the diagonal direction. In other words, the catalyst layer 2cEb and the gas diffusion layer 2gEb are stacked one upon the other, such that two sides of the catalyst layer 2cEb forming the locking element 8 are protruded from the outer peripheral edge of the gas diffusion layer 2gEb and that two sides of the gas diffusion layer 2gEb forming the locking element 8a, are protruded from the outer peripheral edge of the catalyst layer 2cEb. The respective cut-off corners of the catalyst layer 2cEb (electrolyte membrane 1) and the gas diffusion layer 2gEb are preferably located at the diagonal positions in the shifting direction.

FIG. 21C illustrates the state that the end areas of the catalyst layer 2cEb and the gas diffusion layer 2gEb are folded back to form the locking elements 8 and 8a. As a matter of convenience, the contour line of the outer peripheries of the catalyst layer 2cEb and the gas diffusion layer 2gEb before the bending process is shown by the broken line in FIG. 21C. A third step folds the two sides of the catalyst layer 2cEb, which are protruded from the outer peripheral edge of the gas diffusion layer 2gEb, together with the electrolyte membrane 1 toward the gas diffusion layer 2gEb-side to form the locking element 8. The third step also folds the two sides of the gas diffusion layer 2gEb, which are protruded from the outer peripheral edge of the catalyst layer 2cEb, toward the catalyst layer 2cEb-side to form the locking element 8a.

As described above, in this configuration example, the two locking elements 8 and 8a, of different structures are provided in combination on the outer periphery of the electrode 2Eb. This configuration example also effectively prevents the catalyst layer 2cEb from being separated from the gas diffusion layer 2gEb.

Figure 22:
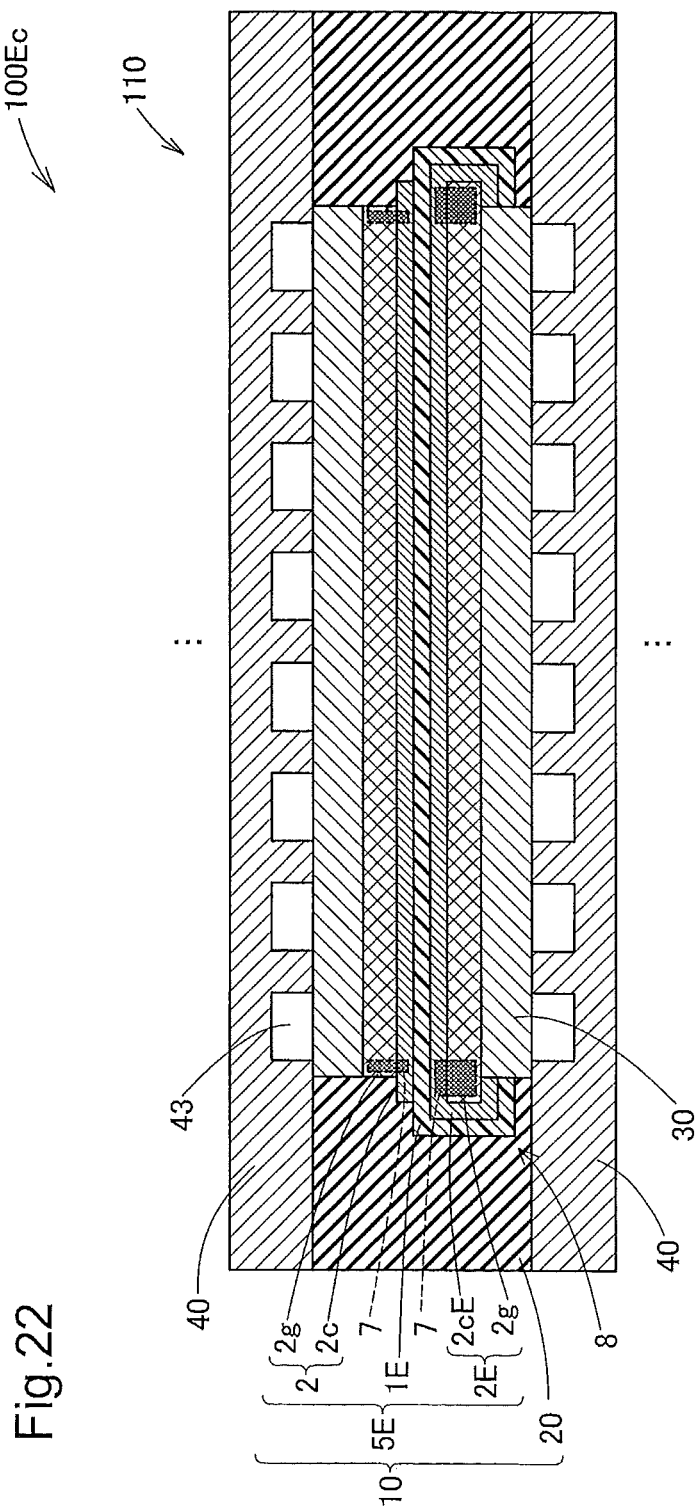
FIG. 22 is a schematic diagram illustrating the structure of a fuel cell as another configuration example according to the sixth embodiment.
Figure 23:
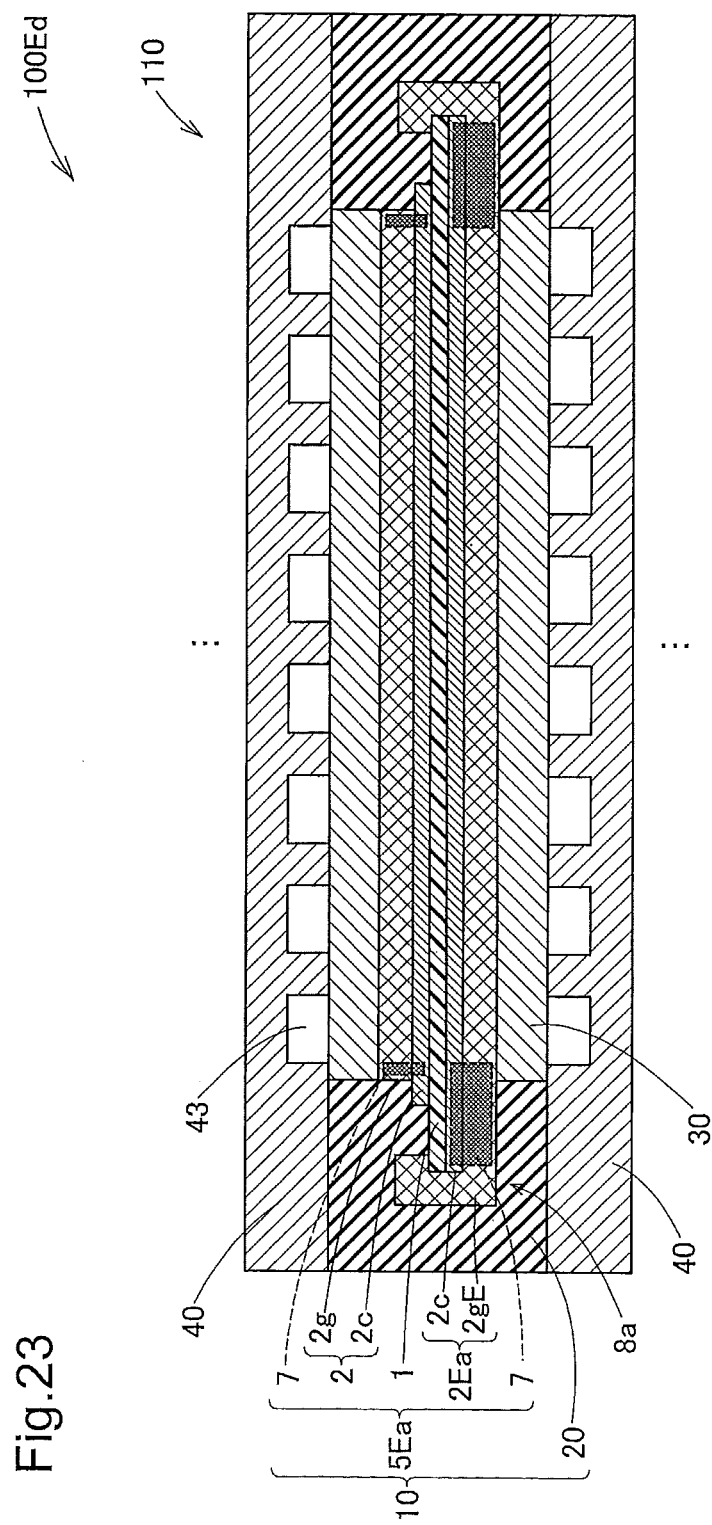
FIG. 23 is a schematic diagram illustrating the structure of a fuel cell as yet another configuration example according to the sixth embodiment.

FIGS. 22 and 23 are schematic diagrams respectively illustrating the structures of fuel cells 100Ec and 100Ed as other configuration examples according to the sixth embodiment. The structures of FIGS. 22 and 23 are substantially similar to the structures of FIGS. 16 and 19 respectively, except that adhesive materials 7 similar to those described in the fifth embodiment are impregnated in the electrodes 2 and 2E or 2Ea. The presence of the adhesive materials 7, in addition to the locking elements 8 and 8a, more effectively prevents the catalyst layer 2c, from being separated from the gas diffusion layer 2g, or 2gE. This also prevents degradation of the electrolyte membrane 1 by the heat of reaction. The electrodes 2 and 2Eb may also include adhesive materials 7 in the structure of FIG. 20.

G. Seventh Embodiment

Figure 24:
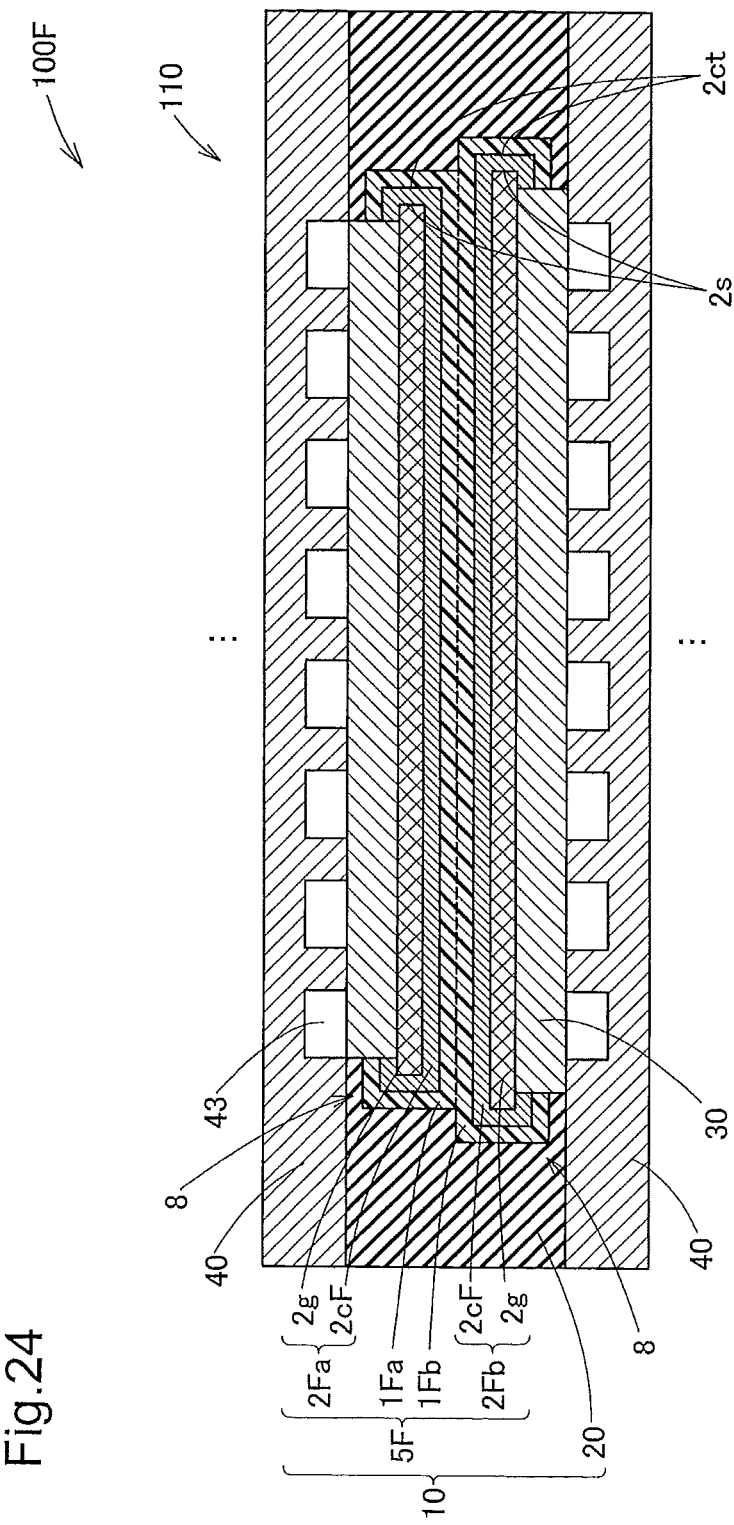
FIG. 24 is a schematic diagram illustrating the structure of a fuel cell according to a seventh embodiment.

FIG. 24 is a schematic diagram illustrating the structure of a fuel cell 100F according to a seventh embodiment of the invention. A membrane electrode assembly 5F of this fuel cell 100F includes a first electrolyte membrane 1Fa and a second electrolyte membrane 1Fb joined with each other, a first electrode 2Fa formed on the outer surface of the first electrolyte membrane 1Fa, and a second electrode 2Fb formed on the outer surface of the second electrolyte membrane 1Fb. In FIG. 24, the joint surface between the first and second electrolyte membranes 1Fa and 1Fb is shown by the broken line.

Each of the first and the second electrodes 2Fa and 2Fb is formed by stacking a catalyst layer 2cF formed to cover the entire outer surface of the first or the second electrolyte membrane 1Fa or 1Fb and a gas diffusion layer 2g, made of a fiber base material. Each of the first and the second electrodes 2Fa and 2Fb has a locking element 8 similar to that described in FIG. 16, which is formed by folding the respective end areas of the catalyst layer 2cF and the first or the second electrolyte membrane 1Fa or 1Fb.

In both the first and second electrodes 2Fa and 2Fb of the fuel cell 100F according to the seventh embodiment, the catalyst layer 2cF-side face of the gas diffusion layer 2g, is made smaller in size than the gas diffusion layer 2g-side face of the catalyst layer 2cF. The locking element 8 is formed by folding the protruded area of the gas diffusion layer 2g-side face of the catalyst layer 2cF, which is protruded from the outer peripheral edge of the gas diffusion layer 2g,, together with the first or the second electrolyte membrane 1Fa or 1Fb toward the gas diffusion layer 2g-side. In the first and the second electrodes 2Fa and 2Fb, the outer peripheral edge of the gas diffusion layer 2g, is located inward of an outer peripheral edge 2ct, of the catalyst layer 2cF forming the locking element 8. In the fuel cell 100F, the first electrode 2Fa serves as the cathode, while the second electrode 2Fb serves as the anode.

In both of the first and the second electrodes 2Fa and 2Fb of the fuel cell 100F according to the fifth embodiment, the catalyst layers 2cF serve as the protective layers of the first and the second electrolyte membranes 1Fa and 1Fb, so as to prevent degradation of the first and the second electrolyte membranes 1Fa and 1Fb. The locking elements 8 are formed in both of the first and the second electrodes 2Fa and 2Fb, so as to prevent the catalyst layer 2cF from being separated from the gas diffusion layer 2g, in both of the first and the second electrodes 2Fa and 2Fb. Additionally, the presence of these locking elements 8 enhances the integrity of the respective components of the membrane electrode assembly 5F and thereby improves the handling property of the membrane electrode assembly 5F in the manufacturing process of the fuel cell 100F.

Figure 25A:
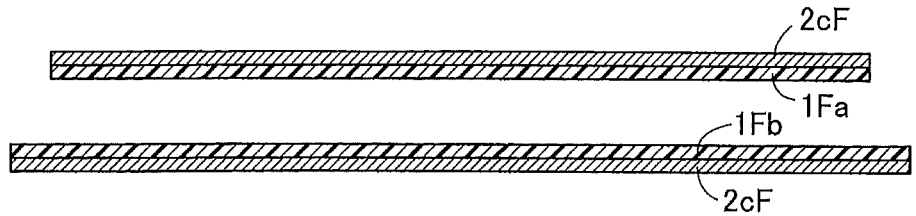
FIGS. 25A to 25D are diagrams sequentially illustrating a manufacturing process of a membrane electrode assembly according to the seventh embodiment.
Figure 25B:
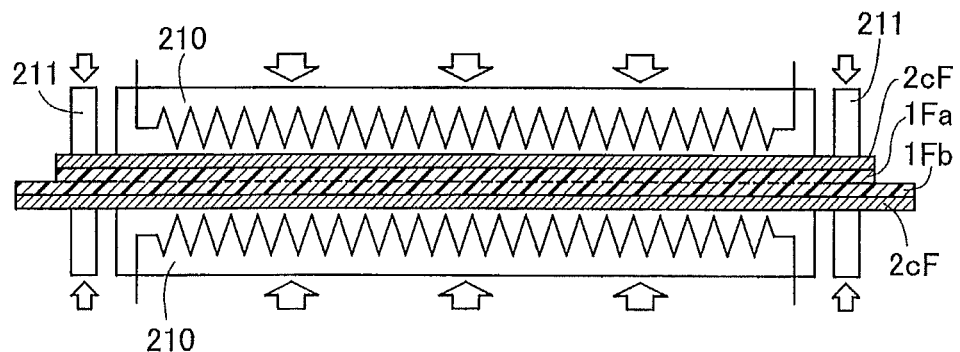

FIGS. 25A to 25D are diagrams schematically illustrating a process of manufacturing the membrane electrode assembly 5F according to the seventh embodiment. A first step provides the first and the second electrolyte membranes 1Fa and 1Fb with the catalyst layers 2cF respectively formed to cover the entire surface on one side (FIG. 25A). A second step stacks the first and the second electrolyte membranes 1Fa and 1Fb with the respective catalyst layers 2cF facing outward and joins together by hot pressing (FIG. 25B).

At this hot pressing step, the first and the second electrolyte membranes 1Fa and 1Fb are located between hot plates 210, such that the outer peripheral edges of the first and the second electrolyte membranes 1Fa and 1Fb are protruded from the hot plates 210. This arrangement prevents the first electrolyte membrane 1Fa and the second electrolyte membrane 1Fb from being joined together at the respective outer peripheral edges. The boundary of the joint between the first and the second electrolyte membranes 1Fa and 1Fb is shown by the broken line in FIG. 25B. In order to prevent heat shrinkage-induced deformation, it is preferable that the outer peripheral edges of the first and the second electrolyte membranes 1Fa and 1Fb protruded from the hot plates 210 are held between holding members 211.

Figure 25C:
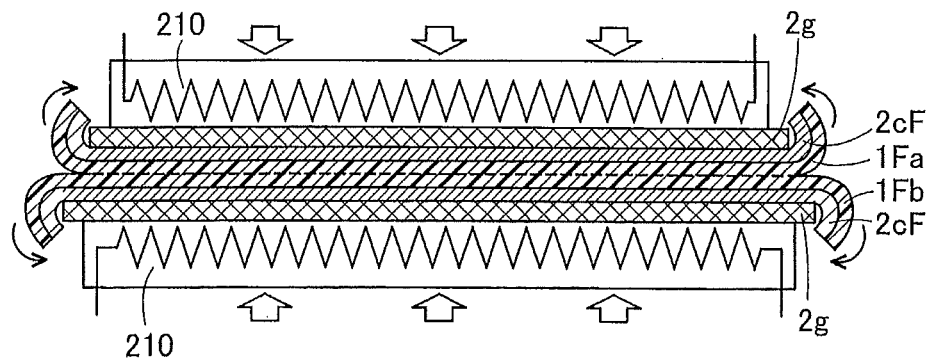
Figure 25D:
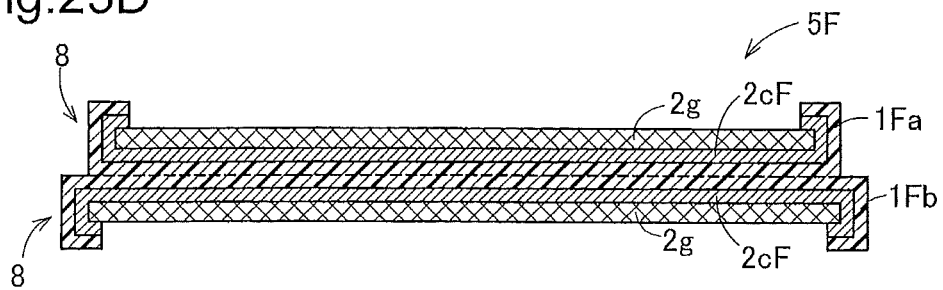

A third step places the gas diffusion layers 2g, outside of the two catalyst layers 2cF and joins the catalyst layers 2cF with the gas diffusion layers 2g, by hot pressing with the hot plates 210 (FIG. 25C). At this step, the entire contact surfaces of the catalyst layer 2cF and the gas diffusion layer 2g, are joined together. During this hot pressing step, the outer peripheral edges of the first and the second electrolyte membranes 1Fa and 1Fb together with the outer peripheral edges of the catalyst layers 2cF are turned up toward the gas diffusion layer 2g-side by heat shrinkage-induced deformation. This deformation forms the locking elements 8 and completes the membrane electrode assembly 5F (FIG. 25D). At this step, for the purpose of forming the locking elements 8, an auxiliary external force may be applied to the outer peripheral edges of the first and the second electrolyte membranes 1Fa and 1Fb and the catalyst layers 2cF.

Figure 26A:
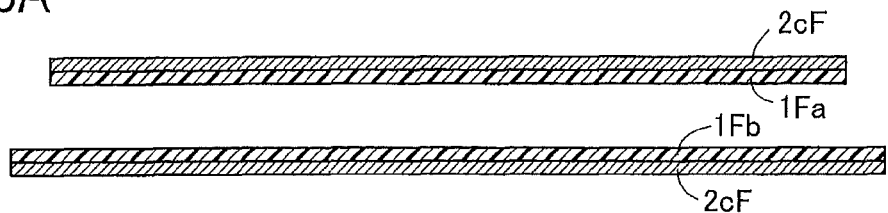
FIGS. 26A to 26D are diagrams sequentially illustrating another manufacturing process of the membrane electrode assembly according to the seventh embodiment.
Figure 26B:
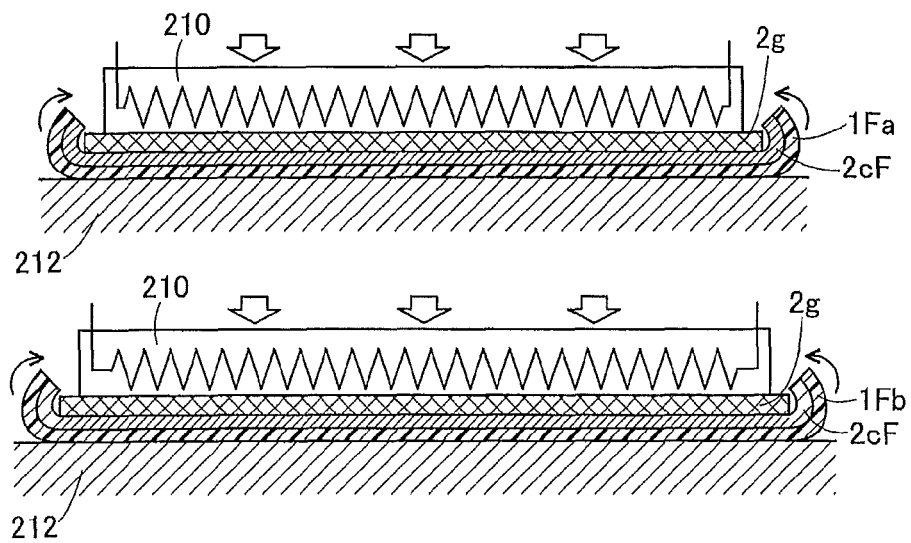

FIGS. 26A to 26D are diagrams sequentially illustrating another process of manufacturing the membrane electrode assembly 5F according to the seventh embodiment. A first step provides the first and the second electrolyte membranes 1Fa and 1Fb (FIG. 26A) like the first step described in FIG. 25A. A second step places the first and the second electrolyte membranes 1Fa and 1Fb with the respective catalyst layers 2cF facing upward on individual bases 212, subsequently places the gas diffusion layers 2g, on the respective catalyst layers 2c, and hot-presses these stacked layers with individual hot plates 210 (FIG. 26B).

Figure 26C:
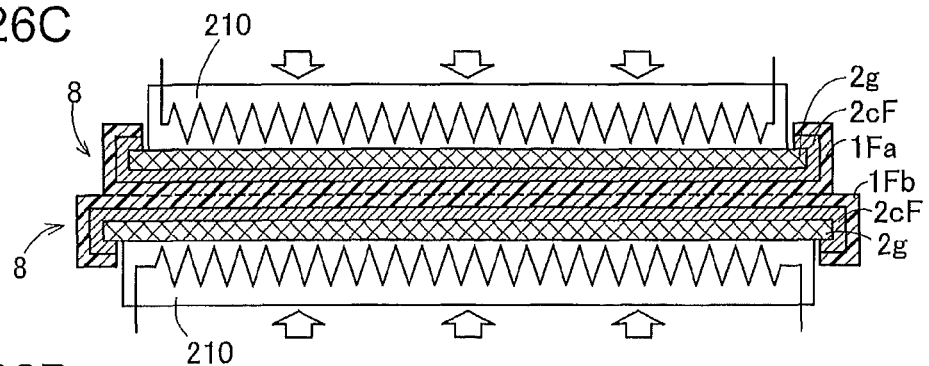
Figure 26D:
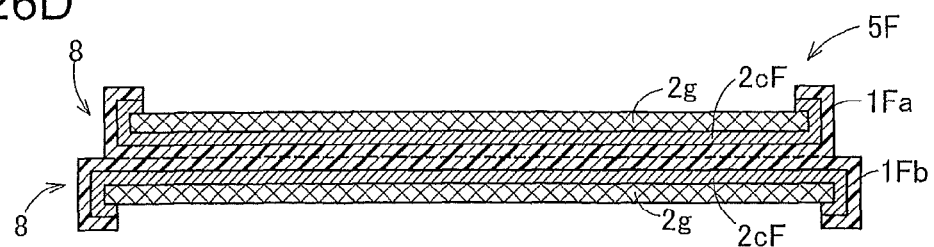

At this step of hot-pressing the first and the second electrolyte membranes 1 Fa, and 1 Fb, the gas diffusion layers 2g, are placed, such that the outer peripheral edges of the first and the second electrolyte membranes 1 Fa, and 1 Fb, are protruded from the outer peripheral edges of the respective gas diffusion layers 2g. During hot pressing, the outer peripheral edge of each of the first and the second electrolyte membranes 1 Fa, and 1 Fb, and the outer peripheral edge of the catalyst layers 2cF are turned up toward the gas diffusion layer 2g-side by heat shrinkage-induced deformation. This completes the first and the second electrodes 2Fa, and 2Fb, respectively having the locking elements 8 formed in the first and the second electrolyte membranes 1 Fa, and 1 Fb. At this step, for the purpose of forming the locking elements 8, an auxiliary external force may be applied to the outer peripheral edges of the first and the second electrolyte membranes 1 Fa, and 1Fb and the catalyst layers 2cF. A third step places the first and the second electrolyte membranes 1Fa and 1Fb stacked one upon the other between the hot plates 210 and joins the first and the second electrolyte membranes 1Fa and 1Fb together by hot pressing (FIG. 26C). This hot pressing step completes the membrane electrode assembly 5F (FIG. 26D). As described above, the manufacturing process of FIG. 25 or FIG. 26 utilizes the heat shrinkage-induced deformation to form the locking elements 8 during hot pressing and thereby enables the membrane electrode assembly 5F to be manufactured with high efficiency.

FIG. 27 is a schematic diagram illustrating the structure of a fuel cell 100Fa as another configuration example according to the seventh embodiment. The structure of FIG. 27 is substantially similar to the structure of FIG. 24, except that adhesive materials 7 similar to those described in the fifth embodiment are impregnated in the first and the second electrodes 2Fa, and 2Fb. Providing the adhesive materials 7 similar to those described in the first fifth embodiment respectively in the first and the second electrodes 2Fa, and 2Fb, in addition to the locking elements 8 more effectively prevents the catalyst layer 2cF from being separated from the gas diffusion layer 2g, and also prevents degradation of the electrolyte membrane 1.

H. Modifications

The invention is not limited to the above embodiments or examples, but a multiplicity of variations and modifications may be made to the embodiments without departing from the scope of the invention. Some examples of possible modifications are given below.

H1. Modification 1

According to the embodiment described above, the gas diffusion layer 2g, is made of the fiber base material. According to another embodiment, however, the gas diffusion layer 2g, may not be necessarily made of the fiber base material but may be made of a material having a large number of pores for gas diffusion or a processed metal plate such as expanded metal. In the application using any of such materials, preventing the direct contact of the gas diffusion layer with the electrolyte membrane effectively prevents the hydrogen peroxide radical from arriving at the electrolyte membrane and thereby prevents degradation of the electrolyte membrane. This also protects the electrolyte membrane from being damaged by the small irregularities present on the outer surface of the base material for the gas diffusion layer or by pressing against the edge of the base material for the gas diffusion layer.

H2. Modification 2

According to the first embodiment described above, no water-repellent layer 3 is provided on the electrode 2 of the membrane electrode assembly 5. According to another embodiment, however, the water-repellent layer 3 may be provided between the gas diffusion layer 2g and the catalyst layer 2c, of the membrane electrode assembly 5. In the latter embodiment, it is preferable that the water-repellent layer 3 is formed to cover at least part of the outer peripheral end face of the gas diffusion layer 2g.

H3. Modification 3

According to the second embodiment described above, the process of forming the electrode 2A forms the groove 6 on the water-repellent layer 3-side face of the gas diffusion layer 2g, and cuts off the outer peripheral edge of the gas diffusion layer 2g, along the groove 6 to form the area covered with the water-repellent layer 3 on the outer peripheral end face of the gas diffusion layer 2g. The electrode 2A may, however, be formed by another process. Another available process may cut off the outer peripheral edge of the base material for the gas diffusion layer 2g, to reduce the size of the base material for the gas diffusion layer 2g, to be smaller than the size of the catalyst layer 2c, and subsequently forms the water-repellent layer 3 to cover one surface of the base material and the outer peripheral end face of the gas diffusion layer 2g.

H4. Modification 4

According to the second embodiment described above, the water-repellent layer 3 is provided between the catalyst layer 2c, and the gas diffusion layer 2g. According to another embodiment, however, the water-repellent layer 3 may be omitted. In the latter embodiment, the outer peripheral edge of the gas diffusion layer 2g, is formed to be tapered toward the catalyst layer 2c-side, and the outer peripheral edge of the gas diffusion layer 2g, is located inward of the outer peripheral edge of the catalyst layer 2c. This also protects the electrolyte membrane 1 from being damaged by fluffs or other projections of the gas diffusion layer 2g, and prevents degradation of the electrolyte membrane 1 by the hydrogen peroxide radical. According to the embodiment described above, the water-repellent layer 3 is made of the water-repellent thin film that contains the water-repellent resin material as the main component. According to another embodiment, however, the water-repellent layer 3 may not be necessarily made of the water-repellent thin film that contains the water-repellent resin material as the main component. The water-repellent layer 3 made of the water-repellent thin film is preferable, since the fluffs 2f of the gas diffusion layer 2g, are covered with the water-repellent resin material as described in FIG. 7.

H5. Modification 5

According to the third embodiment described above, the fuel cell 100B is structured to have the electrode 2A serving as the cathode and the electrode 2B serving as the anode, which respectively receive the supplies of oxygen and hydrogen. According to another embodiment, however, the fuel cell 100B may be structured to have the electrode 2A serving as the anode and the electrode 2B serving as the cathode, which respectively receive the supplies of hydrogen and oxygen. In other words, the requirement for the electrodes of the fuel cell is that the outer peripheral edge of the gas diffusion layer is located inward of the outer peripheral edge of the catalyst layer in at least one of the anode and the cathode.

H6. Modification 6

According to the fifth embodiment described above, the adhesive materials 7 are provided in both of the two electrodes 2A and 2B. According to another embodiment, however, the adhesive material 7 may be omitted in one of the two electrodes 2A and 2B. Such modification is applicable to any of the other configuration examples of the fifth embodiment. The adhesive material 7 provided in the electrode 2B prevents the catalyst layer $2c$, from being deformed with the electrolyte membrane 1 by, for example, heat shrinkage and from being separated from the gas diffusion layer $2g$. The adhesive material 7 provided in the electrode 2A prevents the electrolyte membrane 1 from being degraded by the heat of reaction at the outer peripheral edge of the catalyst layer $2c$.

H7. Modification 7

In the fuel cell 100D according to the fifth embodiment described above, the electrode 2A having the outer peripheral edge of the gas diffusion layer $2g$, located inward of the outer peripheral edge of the catalyst layer $2c$, is structured to serve as the cathode. In the fuel cell 100D, however, the electrode 2A may be structured to serve as the anode.

H8. Modification 8

According to the fifth embodiment described above, the adhesive layer 7 is impregnated in the circumferential area surrounding the seal area SA. The requirement is, however, that the adhesive material 7 is circumferentially impregnated along the outer peripheral edge of the gas diffusion layer $2g$, located inward of the outer peripheral edge of the catalyst layer $2c$. The adhesive material 7 may thus be impregnated in the seal area SA.

H9. Modification 9

According to the fifth embodiment described above, the adhesive material 7 is impregnated in the catalyst layer $2c$, the gas diffusion layer $2g$ and the water-repellent layer 3 along the whole circumference of the area surrounding the seal area SA. According to another embodiment, however, the adhesive material 7 may not be necessarily impregnated in the catalyst layer $2c$, the gas diffusion layer $2g$, and the water-repellent layer 3 along the whole circumference of the area surrounding the seal area SA. In other words, the adhesive material 7 may be provided only in a partial area of the circumferential edges of the gas diffusion layer $2g$, and the catalyst layer $2c$ to such an extent that prevents the gas diffusion layer $2g$, from being separated from the catalyst layer $2c$. The adhesive material 7 may not be impregnated in the electrode but may be provided only at the interface between the gas diffusion layer $2g$, with the water-repellent layer 3 and the catalyst layer $2c$. As described in FIG. 14, however, the structure of the fifth embodiment is preferable to prevent the electrolyte membrane 1 from being degraded by the heat of reaction.

H10. Modification 10

According to the fifth embodiment described above, the water-repellent layers 3 are provided in both of the two electrodes 2A and 2B. According to another embodiment, however, the water-repellent layers 3 may be omitted. Such modification is applicable to any of the other configuration examples of the fifth embodiment. In the structure of the sixth embodiment or the seventh embodiment, on the contrary, the water-repellent layer 3 may be provided on the catalyst layer $2c$-side face of the gas diffusion layer $2g$, 2gE or 2gEb.

H11. Modification 11

According to the sixth embodiment described above, the gas diffusion layer $2g$, is located such that the whole outer circumference of the gas diffusion layer $2g$, is included in the plane of the catalyst layer $2c$, and the locking element 8 is formed circumferentially along the outer peripheral edge of the gas diffusion layer $2g$, by folding the protruded area of the catalyst layer $2c$, protruded from the outer peripheral edge of the gas diffusion layer $2g$. According to another embodiment, however, the locking element 8 may not be necessarily formed circumferentially along the outer peripheral edge of the gas diffusion layer $2g$. For example, the locking element 8 may be formed along only two opposed sides out of the outer peripheral edge of the gas diffusion layer $2g$. In another example, the locking element 8 may be formed by folding a protruded part of the catalyst layer $2c$, protruded from the outer peripheral edge of the gas diffusion layer $2g$, to lock only part of the outer peripheral edge of the gas diffusion layer $2g$.

12. Modification 12

According to the seventh embodiment described above, the first electrode 2Fa is formed to have the smaller size than that of the second electrode 2Fb. According to other embodiments, however, the first electrode 2Fa and the second electrode 2Fb may be formed to have substantially the same size, or the second electrode 2Fb may be formed to have the smaller size than that of the first electrode 2Fa.

13. Modification 13

According to the seventh embodiment described above, the locking element 8 is formed by using heat shrinkage-induced deformation of the first and the second electrolyte membranes 1Fa and 1Fb and the catalyst layers 2cF formed thereon (FIGS. 25C and 26B). The locking element 8 may be formed by any technique other than the heat shrinkage-induced deformation. The locking element 8 may be formed by applying an external force to fold back the outer peripheral edges of the first and the second electrolyte membranes 1Fa and 1Fb and the catalyst layers 2cF formed thereon.

REFERENCE SIGNS LIST 1, 1E, 1Fa, 1Fb: Electrolyte membrane
2, 2A, 2B, 2C, 2E, 2Ea, 2Eb, 2Fa, 2Fb, $2a$:, Electrode
$2c$, 2cE, 2cEb, 2cF: Catalyst layer
$2f$:, Fluff
$2g$, 2gE, 2gEb: Gas diffusion layer
$2s$: Side surface
$2ct$:, Outer peripheral edge
3: Water-repellent layer
4: Protective sheet
5, 5A, 5Aa, 5B, 5C, $5a$, $5b$, 5D, 5E, 5Ea: Membrane electrode assembly
6: Groove
7: Adhesive material
8, $8a$:, Locking element
10: Seal-integrated membrane electrode assembly
20: Seal member
30: Gas passage member
40: Separator
43: Flow channel
100, 100A, 100B, 100C, 100D, 100Da, 100Db, 100E, 100Ea-100Ed, 100F,
$100c$:, Fuel cell
110: Unit cell 200: Pressing tool
202: Cutting tool
210: Hot plate
211: Holding member
212: Base

The invention claimed is:

1. A membrane electrode assembly used for a fuel cell, comprising:
an electrolyte membrane; and
first and second electrode layers arranged on respective sides of the electrolyte membrane, wherein
each of the first and the second electrode layers includes a catalyst layer and a gas diffusion layer, wherein the catalyst layer is arranged to be in contact with the electrolyte membrane, and the gas diffusion layer is placed on the catalyst layer, wherein
in the first electrode layer, a catalyst layer-side face of the gas diffusion layer is made smaller in size than a gas diffusion layer-side face of the catalyst layer, so that an outer peripheral edge of the gas diffusion layer is located inward of an outer peripheral edge of the catalyst layer, and
the second electrode layer provided with a locking element that is formed at the outer peripheral edge of the gas diffusion layer by folding a protruded portion of a material of which the gas diffusion layer of the second electrode layer is made, which is protruded from the outer peripheral edge of the catalyst layer of the second electrode layer, and that serves to prevent the catalyst layer of the second electrode layer from being separated from the gas diffusion layer of the second electrode layer.

2. A membrane electrode assembly used for a fuel cell, comprising:
an electrolyte membrane; and
first and second electrode layers arranged on respective sides of the electrolyte membrane, wherein
each of the first and the second electrode layers includes a catalyst layer and a gas diffusion layer, wherein the catalyst layer is arranged to be in contact with the electrolyte membrane, and the gas diffusion layer is placed on the catalyst layer, wherein
in the first and the second electrode layers, a catalyst layer-side face of the gas diffusion layer is made smaller in size than a gas diffusion layer-side face of the catalyst layer, so that an outer peripheral edge of the gas diffusion layer is located inward of an outer peripheral edge of the catalyst layer, and
the second electrode layer is provided with a locking element that is formed by folding a protruded area of a gas diffusion layer-side face of the catalyst layer of the second electrode layer, which is protruded from an outer peripheral edge of the gas diffusion layer of the second electrode layer, on to a surface of the gas diffusion layer of the second electrode layer which is opposite to the catalyst layer of the second electrode layer and that serves to prevent the catalyst layer of the second electrode layer from being separated from the gas diffusion layer of the second electrode layer.

3. A membrane electrode assembly used for a fuel cell, comprising:
an electrolyte membrane; and
first and second electrode layers arranged on respective sides of the electrolyte membrane, wherein
each of the first and the second electrode layers includes a catalyst layer and a gas diffusion layer, wherein the catalyst layer is arranged to be in contact with the electrolyte membrane, and the gas diffusion layer is placed on the catalyst layer, wherein
in at least the first electrode layer out of the first and the second electrode layers, a catalyst layer-side face of the gas diffusion layer is made smaller in size than a gas diffusion layer-side face of the catalyst layer, so that an outer peripheral edge of the gas diffusion layer is located inward of an outer peripheral edge of the catalyst layer, and
at least the first electrode layer out of the first and the second electrode layers includes a water-repellent layer between the catalyst layer and the gas diffusion layer, wherein
the water-repellent layer is arranged to cover at least part of an outer peripheral end face of the gas diffusion layer,
the gas diffusion layers of the each of the first and the second electrode layers are made of a fiber base material, and
fluffs on the outer peripheral end face of the gas diffusion layer of the first electrode layer are adjusted so as to be directed towards the gas diffusion layer of the first electrode layer from the catalyst layer of the first electrode layer.

4. The membrane electrode assembly according to claim 3, wherein
the water-repellent layer is made of a water-repellent film that contains a water-repellent resin as a main component.

5. A membrane electrode assembly used for a fuel cell, comprising:
an electrolyte membrane; and
first and second electrode layers arranged on respective sides of the electrolyte membrane,
a seal member provided at an outer peripheral edge of the electrolyte membrane and first and second electrode layers, wherein
each of the first and the second electrode layers includes a catalyst layer and a gas diffusion layer, wherein the catalyst layer is arranged to be in contact with the electrolyte membrane, and the gas diffusion layer is placed on the catalyst layer, wherein
in at least the first electrode layer out of the first and the second electrode layers, a catalyst layer-side face of the gas diffusion layer is made smaller in size than a gas diffusion layer-side face of the catalyst layer, so that an outer peripheral edge of the gas diffusion layer is located inward of an outer peripheral edge of the catalyst layer, wherein
the first electrode layer includes an adhesive material, which is provided along a circumferential area surrounding a power generation area, and serves to prevent separation of the gas diffusion layer from the catalyst layer,
the adhesive material is impregnated from an area between the catalyst layer of the first electrode layer and the gas diffusion layer of the first electrode layer into each inside of the catalyst layer of the first electrode layer and the gas diffusion layer of the first electrode layer and is located in a circumferential area along the outer peripheral edge of the gas diffusion layer of the first electrode layer located inward of the outer peripheral edge of the catalyst layer of the first electrode layer, in order to prevent a reactive gas from being diffused to the outer peripheral edge of the catalyst layer of the first electrode layer that is protruded outward from the outer peripheral edge of the gas diffusion layer of the first electrode layer, in the view of the membrane electrode assembly in a direction toward the first electrode layer from the second electrode layer, an outer peripheral edge of at least the catalyst layer of the second electrode layer is located outside of the outer peripheral edge of the catalyst layer of the first electrode layer, the seal member is made of a thermosetting resin, and the adhesive material is not made of a thermosetting resin.

6. The membrane electrode assembly according to claim 5, wherein the outer peripheral edge of the second electrode layer overlaps the electrolyte membrane, in the view of the membrane electrode assembly in a direction toward the second electrode layer from the electrolyte membrane.

7. A membrane electrode assembly used for a fuel cell, comprising:

an electrolyte membrane; and first and second electrode layers arranged on respective sides of the electrolyte membrane, wherein the first electrode layers includes a first catalyst layer and a first gas diffusion layer, wherein the first catalyst layer is arranged to be in contact with the electrolyte membrane, and the first gas diffusion layer is placed on the first catalyst layer, wherein the second electrode layer includes a second catalyst layer and a second gas diffusion layer, wherein the second catalyst layer is arranged to be in contact with the electrolyte membrane, and the second gas diffusion layer is placed on the second catalyst layer, in the first electrode layer a catalyst layer-side face of the first gas diffusion layer is made smaller in size than a first gas diffusion layer-side face of the first catalyst layer, so that an outer peripheral edge of the first gas diffusion layer is located inward of an outer peripheral edge of the first catalyst layer, and in the second electrode layer, a catalyst layer side face of the second gas diffusion layer is made smaller in size than a gas diffusion layer side face of the second catalyst layer, so that an outer peripheral edge of the second gas diffusion layer is located inward of an outer peripheral edge of the second catalyst layer, an outer peripheral edge of the electrolyte membrane is protruded outward of the first and second gas diffusion layers and has a first electrode layer-side portion and a second electrode layer-side portion that are parted in two directions along a thickness direction of the electrolyte membrane and that are separately folded down, the first electrode layer side portion and the second electrode layer side portion are located in a same side on an outer periphery of the electrolyte membrane, and the outer peripheral edge is provided with a first locking element and a second locking element, the first locking element is formed by folding down the first electrode layer side portion of the electrolyte membrane toward the first gas diffusion layer side together with the outer peripheral edge of the first catalyst layer and serves to prevent the first catalyst layer from being separated from the first gas diffusion layer, and the second locking element is formed by folding down the second electrode layer side portion of the electrolyte membrane toward the second gas diffusion layer side together with the outer peripheral edge of the second catalyst layer and serves to prevent the second catalyst layer from being separated from the second gas diffusion layer.

8. A fuel cell, comprising the membrane electrode assembly according to any one of claims 3, 4, 5, 2 and 7.

* * * * *